US010538685B2

(12) United States Patent
Fish

(10) Patent No.: US 10,538,685 B2
(45) Date of Patent: Jan. 21, 2020

(54) HIGH PERFORMANCE COMPOSITIONS AND COMPOSITES

(71) Applicant: Techneglas LLC, Perrysburg, OH (US)

(72) Inventor: Christopher Fish, Central Point, OR (US)

(73) Assignee: Techneglas LLC, Perrysburg, OH (US)

(*) Notice: Subject to any disclaimer, the term of this patent is extended or adjusted under 35 U.S.C. 154(b) by 343 days.

(21) Appl. No.: 15/600,084

(22) Filed: May 19, 2017

(65) Prior Publication Data

US 2017/0321085 A1 Nov. 9, 2017

Related U.S. Application Data

(63) Continuation of application No. 14/506,380, filed on Oct. 3, 2014, now Pat. No. 10,259,972.

(Continued)

(51) Int. Cl.
*C09D 183/04* (2006.01)
*C08L 83/04* (2006.01)
(Continued)

(52) U.S. Cl.
CPC ............ *C09D 183/04* (2013.01); *B29C 70/34* (2013.01); *B29C 70/462* (2013.01); *C08K 3/04* (2013.01);
(Continued)

(58) Field of Classification Search
CPC .. C09D 183/04; C09D 183/08; C09D 183/16; C08G 77/04; C08L 83/00; C08L 83/04;
(Continued)

(56) References Cited

U.S. PATENT DOCUMENTS 3,243,404 A 3/1966 Martellock
3,868,346 A 2/1975 Merrill
(Continued)

FOREIGN PATENT DOCUMENTS

WO 2013170124 11/2013
WO 2014008443 1/2014
(Continued)

OTHER PUBLICATIONS

U.S. Appl. No. 14/506,380; Notice of Allowability, dated Feb. 20, 2019; 6 pages.
(Continued)

*Primary Examiner* — Vincent Tatesure
(74) *Attorney, Agent, or Firm* — Dennis A. Bennett; Clifford A. Schlecht; Global Patent Group, LLC

(57) ABSTRACT

Provided herein is a composition comprising from 50% to 60% polysiloxane consisting essentially of polyphenylmethylsiloxane and α,ω-methoxy-terminated polydimethylsiloxane, from 40% to 50% organic solvent, from 2% to 4% polysilazane, and polysilane of a formula $(R_1R_2Si)_n$, wherein n is greater than 1, and wherein $R_1$ and $R_2$ are the same or different and are alkyl, alkenyl, cycloalkyl, alkylamino, aryl, aralkyl, or alkylsilyl. The composition, after curing, is a flame resistant binder for forming a composition-fiber composite that withstands repeated temperatures over 1800° F. The composition may further comprise from 0.1% to 2% of an enhancer selected from butyltitanate and aminoethylaminopropyltrimethoxysilane ($H_2NC_2H_4NHC_3H_6$—Si$(OCH_3)_3$). The composition may be mixed with fibers in a ratio of 35:65 to 45:55 (w/w), and the composition-fiber mixture may be cured under vacuum at a temperature of 200° F. to 450° F. for 30 minutes to 180 minutes to form a composite.

30 Claims, 11 Drawing Sheets

Related U.S. Application Data

(60) Provisional application No. 61/886,841, filed on Oct. 4, 2013.

(51) Int. Cl.

| | | |
|---|---|---|
| *B29C 70/46* | (2006.01) | |
| *B29C 70/34* | (2006.01) | |
| *C09D 183/16* | (2006.01) | |
| *C08K 3/04* | (2006.01) | |
| *C08K 3/38* | (2006.01) | |
| *C08L 83/00* | (2006.01) | |
| *C08L 83/16* | (2006.01) | |
| *B29K 83/00* | (2006.01) | |
| *B29K 105/12* | (2006.01) | |
| *C08G 77/62* | (2006.01) | |

(52) U.S. Cl.
CPC ............... *C08K 3/38* (2013.01); *C08L 83/00* (2013.01); *C08L 83/04* (2013.01); *C08L 83/16* (2013.01); *C09D 183/16* (2013.01); *B29K 2083/00* (2013.01); *B29K 2105/124* (2013.01); *C08G 77/62* (2013.01); *C08K 2003/385* (2013.01); *Y10T 156/1044* (2015.01); *Y10T 428/1372* (2015.01); *Y10T 428/25* (2015.01); *Y10T 442/20* (2015.04); *Y10T 442/2984* (2015.04)

(58) Field of Classification Search
CPC .. C08L 83/16; C08K 3/04; C08K 3/38; B29C 70/34; B29C 70/462
USPC ............................................. 428/36.4, 292.1
See application file for complete search history.

(56) References Cited

U.S. PATENT DOCUMENTS

| | | | |
|---|---|---|---|
| 4,536,540 A | 8/1985 | Dziark | |
| 6,652,978 B2 | 11/2003 | Lukacs, III et al. | |
| 7,049,384 B1 | 5/2006 | Friebe et al. | |
| 10,259,972 B2 | 4/2019 | Fish | |
| 2004/0170768 A1 | 9/2004 | Ahmed et al. | |
| 2008/0096024 A1 | 4/2008 | Cavallin | |
| 2010/0056687 A1 | 3/2010 | Diakoumakos et al. | |
| 2011/0311830 A1 | 12/2011 | Wade | |
| 2013/0287959 A1* | 10/2013 | Fish | C09D 183/16 427/387 |
| 2015/0099078 A1 | 4/2015 | Fish | |

FOREIGN PATENT DOCUMENTS

| | | |
|---|---|---|
| WO | 2014014542 | 1/2014 |
| WO | 2014130774 | 8/2014 |
| WO | 2015050586 | 4/2015 |
| WO | 2015051301 | 4/2015 |

OTHER PUBLICATIONS

U.S. Appl. No. 14/506,380; Examiner-Initiated Intrview Summary, dated Mar. 20, 2019; 1 page.
U.S. Appl. No. 14/506,380; Notice of Allowability, dated Mar. 20, 2019; 9 pages.
International Application No. PCT/US2013/038644; International Preliminary Report on Patentability, dated Oct. 28, 2014; 10 pages.
International Application No. PCT/US2013/038644; International Search Report, dated Jan. 28, 2014; 02 pages.
International Application No. PCT/US2013/040501; International Preliminary Report on Patentability, dated Nov. 11, 2014; 10 pages.
International Application No. PCT/US2013/040501; International Search Report, dated Sep. 30, 2013; 02 pages.
International Application No. PCT/US2013/049398; International Preliminary Report on Patentability, dated Jan. 6, 2015; 13 pages.
International Application No. PCT/US2013/049398; International Search Report, dated Dec. 20, 2013; 02 pages.
International Application No. PCT/US2014/017596; International Preliminary Report on Patentability, dated Aug. 25, 2015; 07 pages.
International Application No. PCT/US2014/017596; International Search Report, dated Jun. 5, 2014; 02 pages.
International Application No. PCT/US2014/039684; International Preliminary Report on Patentability, date of completion Sep. 2, 2015; 27 pages.
International Application No. PCT/US2014/039684; International Search Report, dated Nov. 19, 2014; 05 pages.
International Application No. PCT/US2014/059139; International Preliminary Report on Patentability, dated Apr. 5, 2016; 14 pages.
International Application No. PCT/US2014/059139; International Search Report, dated Jan. 2, 2015; 03 pages.
U.S. Appl. No. 14/506,380; Applicant Initiated Interview Summary dated May 14, 2018; 02 pages.
U.S. Appl. No. 14/506,380; Examiner Interview Summary Record dated May 14, 2018; 02 pages.
U.S. Appl. No. 14/506,380; Final Office Action dated Apr. 26, 2018; 12 pages.
U.S. Appl. No. 14/506,380; Non-Final Office Action dated Oct. 6, 2017; 12 pages.
U.S. Appl. No. 14/506,380; Response to Non-Final Office Action dated Jan. 25, 2018; 15 pages.
Extended European Search Report dated Apr. 21, 2017, European Patent Application No. 14850495.4.
Weil, Edward D.; "Fire-Protective and Flame-Retardant Coatings—A State-of-the-Art Review", Journal of Fire Sciences, vol. 29, No. 3, May 1, 2011, pp. 259-296.
U.S. Appl. No. 14/506,380; Notice of Allowance dated Jan. 28, 2019; 14 pages.

\* cited by examiner

HIGH PERFORMANCE COMPOSITIONS AND COMPOSITES

CROSS-REFERENCE

This application claims the benefit under 37 C.F.R. § 119(e) of the filing date of provisional application U.S. Ser. No. 61/886,841, filed Oct. 4, 2013, and entitled "High Performance Silicon-based Compositions," and is a continuation of U.S. Ser. No. 14/506,380, filed Oct. 3, 2014, and entitled "High Performance Compositions and Composites," the disclosures of which are incorporated herein by reference in their entireties.

TECHNICAL FIELD

The present disclosure relates to chemical compositions.

BACKGROUND

Chemical structure and conformation of the polymer are among the many factors that influence the type of composition required for a particular application. However, the commercial availability of many useful polymers often limits the applications. For example, for a long time polysilazanes have been synthesized and characterized, which acknowledges that such polymers may be useful in a variety of applications. Currently, however, few products have been developed into a marketable commodity. Additionally, cost limitations prohibit use altogether in some cases.

A great need exists for compositions for use in a wide range of applications. Such compositions would be curable at ambient temperature conditions without requiring an added catalyst, enhancer, or activator for rapid curing, capable of forming thin but durable coatings, protective and heat-stable, displaying excellent hardness, remaining intact even when the substrate is deformed. In addition, compositions that are customizable in terms of coating color, appearance, feel, and glossiness are desirable. Further, compositions being UV-resistant, microbial releasable, easy to clean and maintain, and corrosion resistant are also in great need for their wide range of uses. Therefore, given the limitations of the prior art, it is desirable to have a composition that has the physical and chemical characteristics of the polymer substrates, and results in compositions possessing a number of desirable properties.

SUMMARY

The compositions described herein provide flame resistant binders and coatings that can withstand high temperatures, and that are curable at low temperature, including under ambient conditions. For example, because of its high resistance to thermal decomposition, the compositions may be safely applied to a cookware surface, providing uniform thermal distribution through a continuous, non-porous coating. The composition may also be used to form composition-fiber composites using, for example, 35% to 45% composition to 55% to 65% fiber, including B-staging and prepreg methods.

In particular, one aspect of the present disclosure provides a composition comprising from 50% (w/w of the total composition) to 60% (w/w of the total composition) polysiloxane consisting essentially of polyphenylmethylsiloxane and α,ω-methoxy-terminated polydimethylsiloxane; from 40% (w/w of the total composition) to 50% (w/w of the total composition) organic solvent; from 2% (w/w of the total composition) to 4% (w/w of the total composition) polysilazane; and polysilane of a formula $(R_1R_2Si)_n$, wherein n is greater than 1, and wherein $R_1$ and $R_2$ are the same or different and are alkyl, alkenyl, cycloalkyl, alkylamino, aryl, aralkyl, or alkylsilyl. This composition, after curing, is a flame resistant binder for forming a composition-fiber composite that withstands repeated temperatures over 1800° F.

The composition may further comprise from 0.1% (w/w of the total composition) to 2% (w/w of the total composition) of an enhancer selected from butyltitanate and aminoethylaminopropyltrimethoxysilane ($H_2NC_2H_4NHC_3H_6$—Si$(OCH_3)_3$). The polyphenylmethylsiloxane may comprise a mixture compound having formula $(CH_3SiO_{1.5})_x (C_6H_5SiO_{1.5})_y$, wherein each x and y are greater than 1, and

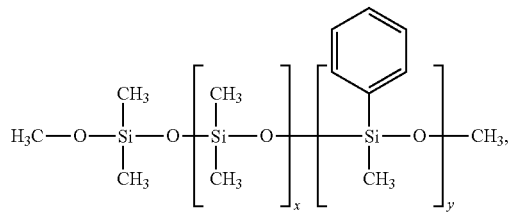

wherein x and y are each between 5 and 25. The α,ω-methoxy-terminated polydimethylsiloxane may have the formula

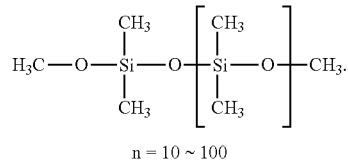

n = 10 ~ 100

The solvent may be isopropanol. The polysilazane may be a polydimethylsilazane comprising the formula $(CH_3)_3Si$—NH—$[(CH_3)_2Si$—NH$]_n$—Si$(CH_3)_3$, wherein n greater than 1. The polysilane may be polydimethylsilane.

In some embodiments, composition may comprise from 50% (w/w of the total composition) to 60% (w/w of the total composition) polysiloxane consisting essentially of polyphenylmethylsiloxane and α,ω-methoxy-terminated polydimethylsiloxane; wherein the polyphenylmethylsiloxane comprises a mixture compound having formula $(CH_3SiO_{1.5})_x(C_6H_5SiO_{1.5})_y$, wherein each x and y are greater than 1, and

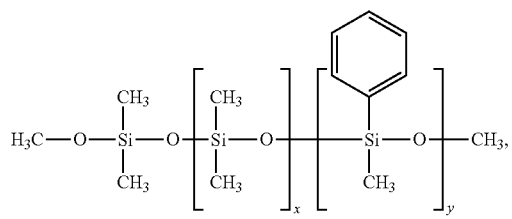

wherein x and y are each between 5 and 25; and wherein the α,ω-methoxy-terminated polydimethylsiloxane has the formula

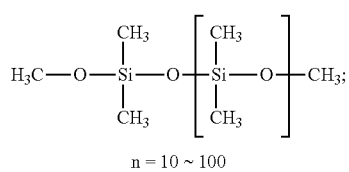

n = 10 ~ 100 from 40% (w/w of the total composition) to 50% (w/w of the total composition) isopropanol; from 2% (w/w of the total composition) to 4% (w/w of the total composition) polydimethylsilazane comprising the formula $(CH_3)_3Si—NH—[*CH_3)_2Si—NH]_n—Si(CH_3)_3$, wherein n greater than 1; from 0.1% (w/w of the total composition) to 2% (w/w of the total composition) of an enhancer selected from butyltitanate and aminoethylaminopropyltrimethoxysilane $(H_2NC_2H_4NHC_3H_6—Si(OCH_3)_3)$; and polydimethylsilane having the formula

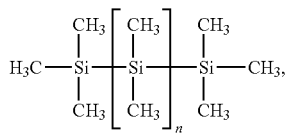

wherein n is greater than 1. This composition, after curing, is a flame resistant binder for forming a composition-fiber composite that withstands repeated temperatures over 1800° F.

In other aspects, the present disclosure provides a composite comprising a composition-fiber mixture. The composition-fiber mixture may comprise fibers and a composition. The composition may comprise from 50% (w/w of the total composition) to 60% (w/w of the total composition) polysiloxane consisting essentially of polyphenylmethylsiloxane and α,ω-methoxy-terminated polydimethylsiloxane; from 40% (w/w of the total composition) to 50% (w/w of the total composition) organic solvent; from 2% (w/w of the total composition) to 4% (w/w of the total composition) polysilazane; and polysilane of a formula $(R_1R_2Si)_n$, wherein n is greater than 1, and wherein $R_1$ and $R_2$ are the same or different and are alkyl, alkenyl, cycloalkyl, alkylamino, aryl, aralkyl, or alkylsilyl. The composition-fiber mixture is cured under vacuum at a temperature of 200° F. to 450° F. for 30 minutes to 180 minutes to form the composite. After curing, the composite flame resistant and withstands repeated temperatures over 1800° F.

The fibers may be selected from the group consisting of carbon fibers, basalt, e-glass, glass ribbon, fiberglass, quartz, and ceramic. The fibers may be in the form of one selected from the group consisting of woven strands, mesh, felt, needle-punched felt, and cloth tape. In particular, the fibers may be a carbon fiber cloth. The ratio of composition to fibers may be from 35:65 to 45:55 (w/w). The composite may further comprise one or more selected from the group consisting of vermiculite, hollow glass, and ceramic spheres.

The curing may occur at a temperature of 200° F. to 350° F. for 60 minutes to 120 minutes. The composite may have a $T_{dec}$ at 10% mass loss of at least 600° C. The composite may have a $T_{dec}$ at 10% mass loss of at least 700° C. The composite may have a $T_{dec}$ at 10% mass loss of at least 800° C. The composite may have a $T_{dec}$ at 50% mass loss of at least 1,000° C.

The present disclosure also provides a method for forming a composite. A composition is provided, which comprises from 50% (w/w of the total composition) to 60% (w/w of the total composition) polysiloxane consisting essentially of polyphenylmethylsiloxane and α,ω-methoxy-terminated polydimethylsiloxane; from 40% (w/w of the total composition) to 50% (w/w of the total composition) organic solvent; from 2% (w/w of the total composition) to 4% (w/w of the total composition) polysilazane; and polysilane of a formula $(R_1R_2Si)_n$, wherein n is greater than 1, and wherein $R_1$ and $R_2$ are the same or different and are alkyl, alkenyl, cycloalkyl, alkylamino, aryl, aralkyl, or alkylsilyl. The composition is mixed with fibers in a ratio of 35:65 to 45:55 (w/w). The composition-fiber mixture is cured under vacuum at a temperature of 200° F. to 450° F. for 30 minutes to 180 minutes to form a composite, which is a flame resistant and withstands repeated temperatures over 1800° F.

The method may further comprise shaping the composition-fiber mixture before curing. The method may further comprise partially curing the composition-fiber mixture before shaping the composition-fiber mixture. The curing may occur in at least one selected from the group consisting of vacuum bags, shrink tape wraps, pre-designed male-to-female mold sets, squeeze plates, and hot press plates. The curing may occur at a temperature of 200° F. to 350° F. for 60 minutes to 120 minutes.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification and the drawings, which forms a part of this disclosure.

BRIEF DESCRIPTION OF THE FIGURES

In addition to the exemplary aspects and embodiments described above, further aspects and embodiments will become apparent by reference to the drawings and by study of the following descriptions.

DETAILED DESCRIPTION

Figure 1:
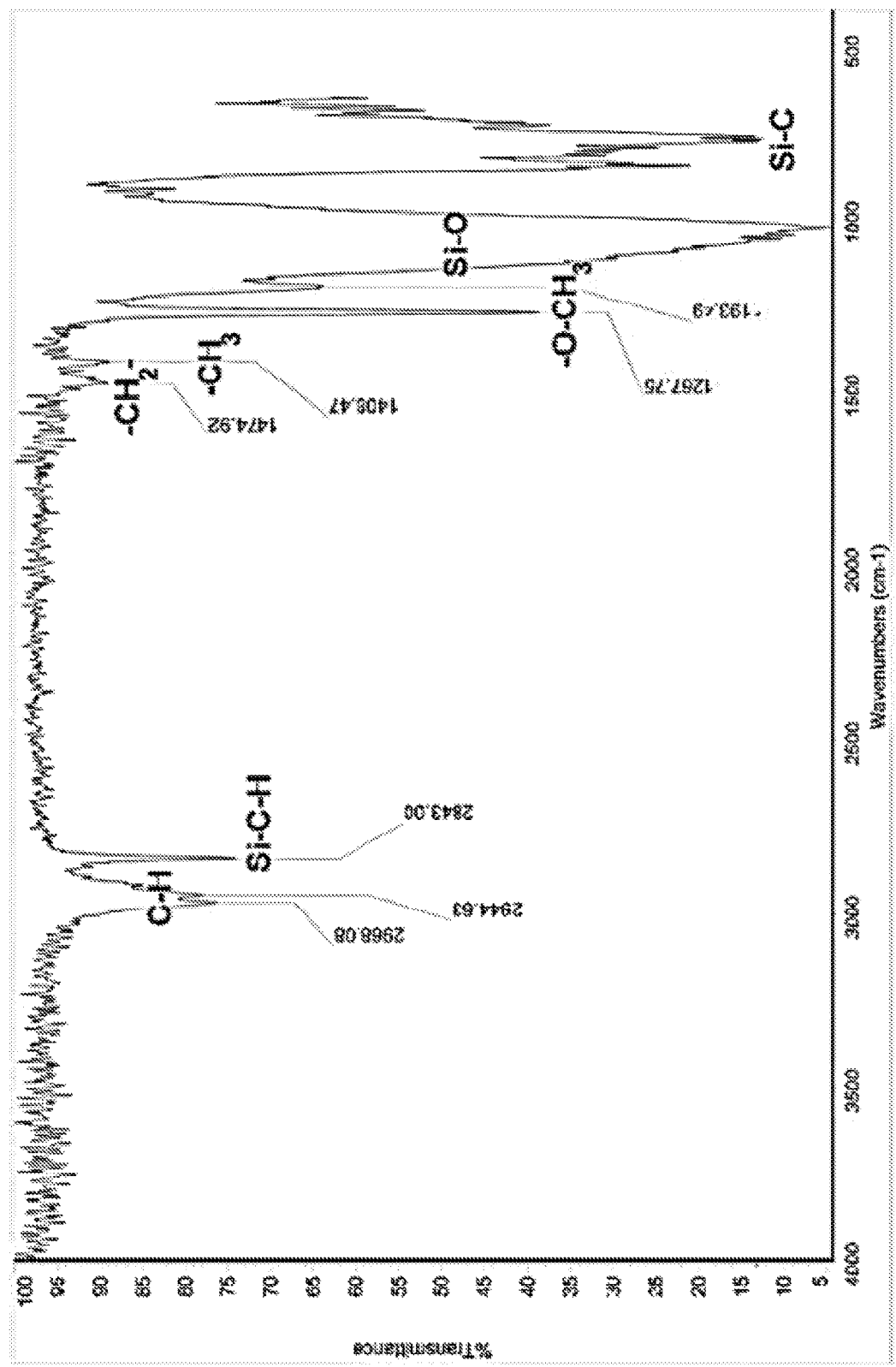
FIG. 1 depicts the Fourier transform infrared (FTIR) spectrum for Silres® MSE-100 from Wacker Chemical Corporation.

The present disclosure may be understood by reference to the following detailed description, taken in conjunction with the drawings as described above.

In particular, one aspect of the present disclosure provides a composition comprising from 50% (w/w of the total composition) to 60% (w/w of the total composition) polysiloxane consisting essentially of polyphenylmethylsiloxane and α,ω-methoxy-terminated polydimethylsiloxane; from 40% (w/w of the total composition) to 50% (w/w of the total composition) organic solvent; from 2% (w/w of the total composition) to 4% (w/w of the total composition) polysilazane; and polysilane of a formula $(R_1R_2Si)_n$, wherein n is greater than 1, and wherein $R_1$ and $R_2$ are the same or different and can be alkyl, alkenyl, cycloalkyl, alkylamino, aryl, aralkyl, or alkylsilyl. This composition, after curing, is a flame resistant binder for forming a composition-fiber composite that withstands repeated temperatures over 1800° F.

This versatile system allows for the molding, shaping, and low-temperature curing of composition-fiber composites at reduced production costs, reduced weight compared to metal and metal alloy counterparts, and reduced pass through heat transfer compared to metal and metal alloy counterparts. Suitable applications for the compositions described herein include, for example, the inner wall of jet engine nacelles, housings, shrouds, fire barrier bulkheads within transportation vehicles, battery enclosures, exhaust tubing and duct work for engines of all types and other sources of heat or flame that needs to be contained for a period of time, fire resistant protective rooms, framework or enclosures within buildings, and the like.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification the drawings, the chemical structures, and descriptions, which forms a part of this disclosure. Any description of any R— group or chemical substituent, alone or in any combination, may be used in any chemical Formula described herein, and Formulae include all conformational and stereoisomers, including diastereomers, epimers, and enantiomers. Moreover any feature of a polymer or constituent disclosed herein may be used in combination with any other feature of a polymer or constituent disclosed herein.

(I) Compositions
(a) Silazane

The compositions of the present disclosure, prior to curing, include a silazane constituent. "Silazane" and "polysilazane," as appearing in the specification and claims, are generic terms intended to include compounds, which contain one or more silicon-nitrogen bonds in which the nitrogen atom is bonded to at least two silicon atoms, and may or may not contain cyclic units. Therefore, the terms "polysilazane" and "silazane polymer" include monomers, oligomers, cyclic, polycyclic, linear polymers or resinous polymers having at least one Si—N group in the compound, or having repeating units of $H_2Si$—NH, that is, $[H_2Si$—$NH]_n$, with "n" greater than 1. The chemical structure for polysilazane is shown below.

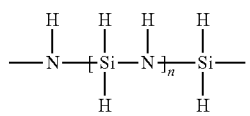

An example of silazane oligomer is disilazane $H_3Si$—NH—$SiH_3$. The oligomeric or polymeric silazanes may be amorphous or crystalline in nature. Silazane polymer chains having both large chains and small rings with a wide range of molecular mass are called polysilazanes. Polysilazane or a mixture of polysilazanes known in the art or commercially available include such products generally known among persons skilled in the art as silazanes, disilazanes, polysilazanes, ureasilazanes, polyureasilazanes, aminosilanes, organosilazanes, organopolysilazanes, inorganic polysilazanes, and others employing liquid anhydrous ammonia in their production. A polysilazane with the general formula $(CH_3)_3Si$—NH—$[(CH_3)_2Si$—$NH]_n$—$Si(CH_3)_3$ is designated as polydimethylsilazane. One group of polysilazane, $[R_1R_2Si$—$NH]_n$, is isoelectronic with and close relatives to polysiloxane $[R_1R_2Si$—$O]_n$. Additionally, Si—N bond can be found in triethylsilylamine $((H_5C_2)_3Si$—$NH_2)$, which is a typical aminosilane. Further, small ring-shaped molecules with a basic group of Si—N are called "cyclosilazanes." For example, triazatrisilane $(H_9N_3Si_3)$ is a typical cyclotrisilazane.

For polymerized compositions, ammonia may be used to dissolve and age the materials, which must be carefully regulated through venting to control the molecular weight of the composition starting material. This reaction results in a $R_3Si$—$NH_2$ group to form silazane units by releasing off the ammonia. High moisture and/or water will cause decomposition of the polymerized material, due to the water molecule attacking the silicon atoms and the Si—N bonds are then severed. This reaction produces a $R_3Si$—$NH_2$ and HO—$SiR_3$ which further react to form $R_3Si$—O—$SiR_3$ siloxane. The polymerized liquid is clear to translucent, colorless to pale yellow, and may form a solid. Exposure to higher temperature and or sunlight can also increase the mass of the polymerized liquid by encouraging further thermal or photochemical polymerization. In the liquid form, trace elements, free ammonia and ammonium chloride can often be detected.

Polysilazanes usually do not vaporize due to the strong molecular interactions. Heat promotes crosslinking of the polysilazanes to form an even higher molecular weight structures. For example, at temperatures of 100-300° C., hydrogen gas evolves and ammonia promotes further crosslinking. As provided in the present disclosure, vinyl substituents promote continued crosslinking, increased molecular strength, and conversion of liquid compositions into solids. Once temperatures reach 700-1200° C., the multi-dimensional amorphous network with Si, C and N atoms is formed, resulting in SiCN ceramic. This "pyrolysis" of polysilazanes produces ceramic materials with low viscosity in high yield. This also makes the polysilazanes an excellent choice for precursors for other ceramic matrices. As provided in the present disclosure, polymers combined with low molecular weight components offer added value for the generation of resistant and fast-curing coatings, because new chains can be formed that can improve and enhance the resulting material properties.

Alternatively, polysilazane may be commercially available. For example, polysilazane (<99%) in tert-butyl acetate solvent is a resin having 100% solids as a liquid of low viscosity. This liquid polysiloxazane-based coating resin may comprise more than 99% polysilazane, with less than 5% cyclosilazane, a cyclic form of polysilazane. A similar product is also available from other manufacturers. In other embodiments, the silazane may be DT-6062, DT-6063, or combinations thereof.

Polysilazane may comprise between from about 1% and about 76% (w/w) of the total formula weight of compositions. In some embodiments, polysilazane may comprise about 76%, 70%, 65%, 62%, 57%, 52%, 47%, 42%, 37%, 32%, 27%, 22%, 12%, 10%, 8%, 5%, 4%, 3%, 2%, 1% (w/w, of the total composition), or any range thereof, of the composition. For example, the amount of polysilazane present in the composition may range from about 1% to about 3%, from about 2% to about 4%, from about 4% to about 6%, from about 5% to about 8%, from about 6% to about 9%, from about 7% to about 10%, from about 8% to about 11%, from about 9% to about 12%, from about 10% to about 15%, from about 12% to about 22%, from about 18% to about 28%, from about 25% to about 35%, from about 32% to about 42%, from about 40% to about 50%, from about 48% to about 58%, from about 55% to about 65%, from about 60% to about 70%, from about 68% to about 76% (w/w), of the total composition.

In some embodiments, the amount of polysilazane present in the composition may be from about 1% to about 15%, (w/w) of the total composition.

In an exemplary embodiment, the amount of polysilazane present in the composition may be from about 2% to about 8%, (w/w) of the total composition.

In another exemplary embodiment, the amount of polysilazane present in the composition may be about 4% (w/w) of the total composition.

In some embodiments, the amount of polysilazane present in the composition may be greater than 1% (w/w) of the total composition.

In another embodiment, the amount of polysilazane present in the composition may be less than 15% (w/w) of the total composition.

(b) Siloxane

The compositions of the present disclosure may also include a siloxane. A "siloxane" is a chemical compound having branched or unbranched backbones consisting of alternating silicon and oxygen atoms —Si—O—Si—O— with side chains R attached to the silicon atoms ($R_1R_2SiO$), where R is a hydrogen atom or a hydrocarbon group. Polymerized siloxanes, including oligomeric and polymeric siloxane units, with organic side chains (R≠H) are commonly known as polysiloxanes, or $[SiOR_1R_2]_n$, wherein n is greater than 1. The chemical structure for a linear polysiloxane is shown below:

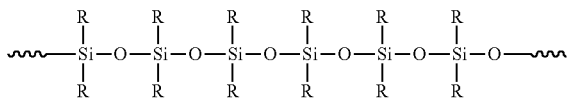

In addition to hydrogen, $R_1$ and $R_2$ of polysiloxane may be independently selected from the group consisting of alkyl, alkenyl, cycloalkyl, alkylamino, aryl, aralkyl, or alkylsilyl. Thus, $R_1$ and $R_2$ may be, for example, methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. These alkyl, alkenyl, cycloalky, aryl, alkyl amino, aralkyl and alkylsilyl groups may each optionally be substituted by one or more substituents which contain heteroatoms, such as halides, like chlorine, bromine and iodine; alkoxy groups, like ethoxy, and also acyl groups, such as acetyl and propionyl. Organic side groups can be used to link two or more of these —Si—O— backbones together. By varying the —Si—O— chain lengths, side groups, and crosslinking, polysiloxanes can vary in consistency from liquid to gel to rubber to hard plastic.

Suitable examples of polysiloxane include, but are not limited to, polydimethylsiloxane ($[SiO(CH_3)_2]_n$, PDMS), α,ω-methoxy-terminated polydimethylsiloxane, poly(methoxymethylsiloxane), polydiphenylsiloxane ($[SiO(C_6H_5)_2]_n$), α,ω-methoxy-terminated polydiphenylsiloxane, and poly(phenylmethylsiloxane) (($CH_3SiO_{1.5})_x(C_6H_5SiO_{1.5})_y$), and α,ω-methoxy-terminated poly(phenylmethylsiloxane), wherein n, x, and y are integers greater than 1.

In some embodiments, the siloxane may be a methoxy-functional polysiloxane, such as an α,ω-methoxy-terminated polydimethylsiloxane or a poly(methoxymethylsiloxane) comprising repeating monomeric units of $SiCH_3OCH_3O$. One example of a methoxy-functional polysiloxane is Dow Corning™ 3074 intermediate, a solventless liquid silicone resin which chemically reacts with organic resins that contain active hydroxyl groups to form silicone-organic copolymer, or which can self-condense to produce cured, silicone homopolymers. Other examples of α,ω-methoxy-terminated polydimethylsiloxanes described herein include, but are not limited to, Silres™ MSE-100, Silres™ MK, and Silres™ SY 409.

In some embodiments, the composition comprises a polydimethylsiloxane. The chemical structure for polydimethylsiloxane is shown below:

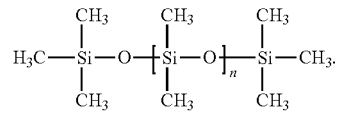

In some embodiments, the siloxane may be octamethyltrisiloxane, $[(CH_3)_3SiO]_2Si(CH_3)_2$, a linear siloxane in the polydimethylsiloxane family with the INCI name of trisiloxane. The chemical structure for octamethyltrisiloxane is shown below:

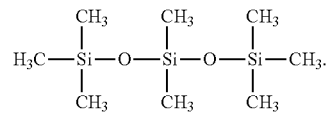

In other embodiments, the siloxane may be a Silres® MSE-100 (Wacker Chemical Corporation), consisting of 1 to 10 repeating dimethylsiloxane units. The FTIR spectrum for Silres® MSE-100 is depicted at FIG. 1 indicates low concentrations (<2 ppm) of residual toluene and methanol in the bulk material. The chemical structure for Silres® MSE-100 is shown below:

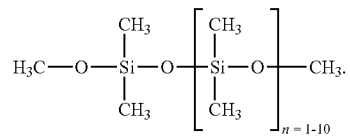

In still other embodiments, the siloxane may be Silres® MK (Wacker Chemical Corporation), consisting of 10 to 100 repeating dimethylsiloxane units. The chemical structure for Silres® MK is shown below:

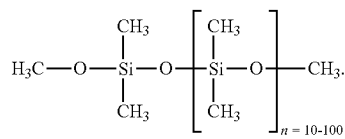

Other methylated siloxanes include, but are not limited to: hexamethyldisiloxane, cyclotetrasiloxane, octamethylcyclotetrasiloxane, decamethyltetra-siloxane, decamethylcyclopentasiloxane. The method of producing high molecular weight polysiloxane product was disclosed in US. App. Pub. 2009/0253884. In addition, polysiloxane may be commercially available. As one example, polydimethylsiloxane, is supplied in isopropyl acetate solvent by Genesee Polymers Corp. (Burton, Mich.), and it is sold as dimethyl silicone fluids G-10 product. In some exemplary embodiments, the siloxane may be Techneglas™ GR-908F produced by Techneglas, LLC., Perrysburg, Ohio USA and consisting of 98-99 wt. % polyphenylmethylsiloxane $((CH_3SiO_{1.5})_x (C_6H_5SiO_{1.5})_y$, CAS Reg. No. 67763-03-5) in 1-2 wt. % ethanol.

In other embodiments, the siloxane Wacker Silres™ SY 409, a methylphenylsilicone resin, as shown below:

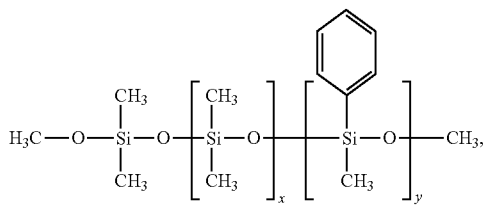

where x and y may each be between 5 and 25.

In some embodiments, the siloxane may comprise an amine-functional polysiloxane. One example of an amine-functional polysiloxane is Dow Corning™ 3055 resin.

In other embodiments, the siloxane may comprise silsesquioxane. "Silsesquioxanes" or "caged silsesquioxanes" are caged organosilicon compounds with the empirical formula of $RSiO_{3/2}$, wherein R is a hydrocarbyl. In various embodiments, the R is an alkyl, such as methyl. Typically, cages of 6-14 silicon atoms and 9-21 oxygen atoms may coexist. A non-limiting example of methylsilsesquioxane is a cage formed by eight silicon atoms and twelve oxygen atoms, as shown below:

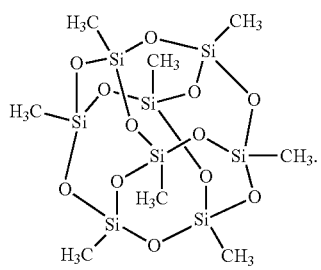

Once reacted, silsesquioxanes form a tightly interwoven and highly polymeric network. Silsesquioxane and the networks they form are generally not soluble in water. The final material may be substantially free of solvents and is non-toxic. These final materials are especially well-suited from medical applications where the presence of unwanted solvents and toxic agents could be harmful to the patient.

The polysiloxane may be used as provided by the manufacturer. Generally, the amount of polysiloxane used in the compositions is from about 15% and about 60% (w/w) of the total formula weight of composition. In some embodiments, polysiloxane may comprise about 15%, 16%, 17%, 18%, 19%, 20%, 21%, 22%, 23%, 24%, 25%, 26%, 27%, 28%, 29%, 30%, 31%, 32%, 33%, 34%, 35%, 40%, 45%, 50%, 55%, or 60% (w/w, of the total composition), or any range thereof, of the composition.

For example, in some embodiments, the amount of polysiloxane present in the composition may range from about 10% to about 5%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, or from about 55% to about 60% (w/w) of the total composition.

In exemplary embodiments, the amount of polysiloxane present in the composition ranges from about 10% to about 60% (w/w) of the total composition.

In some embodiments, the amount of polysiloxane present in the composition ranges from about 25% to about 35% (w/w) of the total composition.

In other embodiments, the amount of polysiloxane present in the composition ranges from about 20% to about 30% (w/w) of the total composition.

In some other embodiments, the amount of polysiloxane present in the composition ranges from about 40% to about 3050 (w/w) of the total composition.

In yet other embodiments, the amount of polysiloxane present in the composition is greater than about 10% (w/w) of the total composition.

In still other embodiments, the amount of polysiloxane present in the composition is less than about 60% (w/w) of the total composition.

(c) Boron Constituent

The compositions as described herein may further comprise a boron constituent. In some embodiments, the boron constituent may be selected from one or more selected from the group consisting of boric acid, borate, borax, boron oxide, and particulate boron nitride, which has a $d_{50}$ value of less than 1 micron.

"Boric acid", also called "hydrogen borate," "boracic acid," "orthoboric acid" and "acidum boricum," is a weak, monobasic Lewis acid of boron used as an antiseptic, insecticide, flame retardant, or neutron absorber. It has the chemical formula $H_3BO_3$ (or $B(OH)_3$), and exists as colorless crystals or as a white powder that dissolves in water. Boric acid may be prepared by reacting borax (sodium tetraborate decahydrate) with a mineral acid, such as hydrochloric acid.

"Boron oxide" may refer to boron trioxide ($B_2O_3$), the most common form, boron monoxide ($B_2O$) or boron suboxide ($B_6O$). Boron trioxide (or diboron trioxide) is almost always found as the vitreous (amorphous) form, but can be crystallized under prolonged heating. Glassy boron oxide (g-$B_2O_3$) is composed of boroxol rings which are six-membered rings composed of alternating 3-coordinate boron and 2-coordinate oxygen. The crystalline form ($\alpha$-$B_2O_3$) is exclusively composed of $BO_3$ triangles. This trigonal, quartz-like network undergoes a coesite-like transformation to monoclinic β-$B_2O_3$ at 9.5 GPa. Boron monoxide ($B_2O$) may exist in diamond-like and graphite-like $B_2O$. Boron suboxide (chemical formula $B_6O$) is built of eight icosahedra at the apexes of the rhombohedral unit cell (space group R3-m).

"Borate" refers to boron-containing oxyanions or to chemical compounds which contain borate anions. Larger borates are composed of trigonal planar $BO_3$ or tetrahedral $BO_4$ structural units, joined together via shared oxygen atoms and may be cyclic or linear in structure. An example of a borate, it the tetraborate anion (tetramer), which includes two tetrahedral and two trigonal boron atoms symmetrically assembled in cyclic structure. The two tetrahedral boron atoms are linked together by a common oxygen atom and each also bears a negative net charge brought by the supplementary OH— groups laterally attached to them. Examples of metal borates include, but are not limited to, diborate $B_2O_5^{4-}$, found in $Mg_2B_2O_5$ (suanite); triborate $B_3O_7^{5-}$, found in $CaAlB_3O_7$ (johachidolite); and tetraborate $B_4O_9^{6-}$, found in $Li_6B_4O_9$. Metaborates, such as $LiBO_2$, contain chains of trigonal $BO_3$ structural units, each sharing two oxygen atoms with adjacent units, whereas $NaBO_2$ and $KBO_2$ contain the cyclic $B_3O_6^{2-}$ ion.

Borax is a salt of boric acid. Powdered borax is white, consisting of soft colorless crystals that dissolve easily in water. The term "borax" may refer to sodium borate, sodium tetraborate, disodium tetraborate, anhydrous borax ($Na_2B_4O_7$), borax pentahydrate ($Na_2B_4O_7 \cdot 5H_2O$), borax decahydrate ($Na_2B_4O_7 \cdot 10H_2O$ or $Na_2[B_4O_5(OH)_4] \cdot 8H_2O$).

The compositions described herein may comprise a particulate boron nitride. Boron nitride (BN) consists of equal numbers of boron and nitrogen atoms and is isoelectronic to a similarly structured carbon lattice and, thus, may exist in various crystalline forms. Hexagonal BN (h-BN) corresponds to the structure of graphite is the most stable and softest among BN polymorphs. Cubic BN (c-BN) has a sphalerite structure and is analogous to diamond, having a hardness similar to diamond and thermal and chemical stabilities superior to those of diamond. Less common wurtzite BN is similar to lonsdaleite and may be harder than c-BN.

Boron nitride is not naturally occurring and is typically synthesized from boric acid or boron trioxide. The initial product is amorphous BN powder, which may be converted to crystalline h-BN by heating under nitrogen above 1500° C. c-BN may be made by annealing h-BN powder at higher temperatures under pressure above 5 GPa. Contrary to diamond, larger c-BN pellets may be produced by fusing (sintering) c-BN powder. Because of its excellent thermal and chemical stability, boron nitride ceramics may be used in high-temperature equipment, such as composition-fiber composites formed from compositions described herein.

"Particle size distribution" ($d_{50}$, ×50), also known as the "median diameter" or the "median value of the particle size distribution," is the value of the particle diameter at 50% in the cumulative distribution. This parameter characterizes particle size. For example, if $d_{50}$ equals 0.58 μm, then 50% of the particles in the sample are larger than 0.58 μm, and 50% smaller than 0.58 μm. $d_{50}$ usually represents the particle size of group of particles. More specifically, $d_{50}$ may be divided into $d_{v50}$ (volume distribution), $d_{w50}$ (mass distribution), and $d_{n50}$ (number distribution). In embodiments where the particles composing particle system have same or almost same particle size, the particle system is "monodisperse." Where the particle system comprises particles of different sizes, it is "polydisperse."

In exemplary embodiments, the compositions comprise particulate boron nitride, which has a $d_{50}$ value of less than 1 micron. In general, the $d_{50}$ value ranges from about 0.001 μm (1 nm) to about 0.999 μm. In various embodiments, the $d_{50}$ value may range from 0.001 μm to about 0.01 μm, from about 0.01 μm to about 0.05 μm, from 0.05 μm to about 0.1 μm, from about 0.1 μm to about 0.2 μm, from about 0.2 μm to about 0.3 μm, from about 0.3 μm to about 0.4 μm, from about 0.4 μm to about 0.5 μm, from about 0.5 μm to about 0.6 μm, from about 0.6 μm to about 0.7 μm, from about 0.7 μm to about 0.8 μm, from about 0.8 μm to about 0.9 μm, or from about 0.9 μm to about 0.999 μm.

Generally, the amount of boron-containing constituent can and will vary. In some embodiments, the amount of boron-containing constituent in the composition ranges from about 1% to about 30% (w/w, of the total composition), such as from about 1% to about 5%, from about 5% to about 10%, from about 10% to about 15%, from about 15% to about 20%, from about 20% to about 25%, or from about 25% to about 30% (w/w, of the total composition).

In exemplary embodiments, the boron-containing constituent present in the composition ranges from about 5% to about 20% (w/w) of the total composition.

In other embodiments, the amount of boron-containing constituent present in the composition is greater than about 5% (w/w) of the total composition.

In another embodiment, the amount of boron-containing constituent present in the composition is less than about 20% (w/w) of the total composition.

(d) Carbon Nanofibers

In some embodiments, the compositions described herein may further comprise carbon nanofibers. The term "carbon nanofibers" encompasses vapor grown carbon fibers (VGCFs), or vapor grown carbon nanofibers (VGCNFs) that comprise cylindrical nanostructures with graphene layers arranged as stacked cones, cups or plates. The term also includes carbon nanofibers with graphene sheets wrapped into cylinders, also called "carbon nanotubes" or "CNTs." These sheets are rolled at specific and discrete (chiral) angles, and the combination of the rolling angle and radius may influence the nanotube's properties, for example, whether the individual nanotube shell functions as a metal or as a semiconductor. Nanotubes may be categorized as single-walled nanotubes (SWNTs) or multi-walled nanotubes (MWNTs). Individual nanotubes may naturally align themselves into ropes held together by van der Waals forces such as pi-stacking. Nanotubes have been constructed with length-to-diameter ratio of up to $1.32 \times 10^8$:1, significantly larger than for any other material. These cylindrical carbon molecules have extraordinary thermal conductivity and mechanical and electrical properties.

Generally, the amount of carbon nanofibers used in the composition may range from about 0% and about 50% (w/w) of the total formula weight of composition. In some embodiments, when present, carbon nanofibers may comprise about 0.1%, 0.5%, 1%, 2%, 3%, 4%, 5%, 6%, 7%, 8%, 9%, 10%, 11%, 12%, 13%, 14%, 15%, 20%, 25%, 30%, 40%, 45%, or 50% (w/w, of the total composition), or any range thereof, of the composition.

For example, in some embodiments the amount of carbon nanofibers present in the composition may range from about 0.1% to about 0.5%, from about 0.5.% to about 1%, from about 1% to about 5%, from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, or from about 55% to about 60% (w/w) of the total composition.

In exemplary embodiments, the amount of carbon nanofibers present in the composition may range from about 0.1% to about 1% (w/w) of the total composition.

In other embodiments, the amount of carbon nanofibers present in the composition may be greater than about 0.1% (w/w) of the total composition.

In another embodiment, the amount of carbon nanofibers present in the composition may be less than about 1% (w/w) of the total composition.

(e) Halloysite

In some embodiments, the compositions described herein may further comprise halloysite.

The term "halloysite" encompasses a naturally-occurring 1:1 aluminosilicate clay in the kaolinite family with the chemical formula $Al_2Si_2O_3(OH)$. Halloysite's main constituents are aluminum (20.90%), silicon (21.76%) and hydrogen (1.56%). Halloysite is typically formed by hydrothermal alteration of aluminosilicate minerals, where it may be intermixed with dickite, kaolinite, montmorillonite, and other clay minerals. Halloysite may be mined, for example, from Washoe County, Nev.; Wagon Wheel Gap, Colo.; Jaup County, Utah; and at various sites in China. Halloysite can occur in several structures, but predominantly exists as in a tubular form on the nanometer scale. When nanotubal, the outside and inside diameters of the halloysite nanotubes are generally in the range of about 10 nm to about 50 nm, such as from about 5 nm to about 20 nm. Generally, halloysite nanotubes do not require significant chemical modification or complex chemical processing, such as intercalation or exfoliation, to produce stable nanoparticulate clay dispersions in the composition, thereby reducing processing cost compared to alternative materials.

In some embodiments, the halloysite may be milled to an extremely fine, near white powder that flows and handles like flour.

Generally, the amount of halloysite used in the composition may range from about 0% and about 50% (w/w) of the total formula weight of composition. In some embodiments, halloysite may comprise about 0.1%, 0.5%, 1%, 2%, 3%, 4%, 5%, 6%, 7%, 8%, 9%, 10%, 11%, 12%, 13%, 14%, 15%, 20%, 25%, 30%, 40%, 45%, or 50% (w/w, of the total composition), or any range thereof, of the composition.

For example, in some embodiments the amount of halloysite present in the composition may range from about 0.1% to about 0.5%, from about 0.5.% to about 1%, from about 1% to about 5%, from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, or from about 55% to about 60% (w/w) of the total composition.

In exemplary embodiments, the amount of halloysite present in the composition may range from about 0.1% to about 1% (w/w) of the total composition.

In other embodiments, the amount of halloysite present in the composition may be greater than about 0.1% (w/w) of the total composition.

In another embodiment, the amount of halloysite present in the composition may be less than about 1% (w/w) of the total composition.

(f) Silane

In some embodiments, the compositions of the present disclosure may further include a silane. Silanes are compounds which contain one or more silicon-silicon bonds. Polysilanes $[R_1R_2Si—R_1R_2Si]_n$ are a large family of inorganic polymers. The number of repeating units, "n," determines the molecular weight and viscosity of the composition. $R_1$ and $R_2$ may be independently selected from the group consisting of hydrogen, alkyl, alkenyl, cycloalkyl, alkylamino, aryl, aralkyl, or alkylsilyl. Thus, $R_1$ and $R_2$ may be, for example, methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. A polymer with the general formula $—[(CH_3)_2Si—(CH_3)_2Si]—_n$, is designated as polydimethylsilane. The chemical structure of polydimethylsilane is shown below:

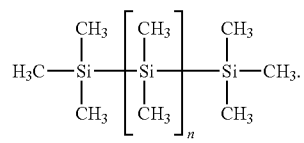

High molecular weight polysilane product with a narrow molecular weight distribution may be obtained by the process of U.S. Pat. No. 5,599,892. Polysilane is also available as a resin system supplied in amyl acetate blend from Kadko, Inc. (Beech Grove, Ind.), and it is sold as a KADKLAD R2X3™ product. Polysilane as provided in the form of KADKLAD R2X3 resin may comprises from about 1% and about 9% (w/w) of the total formula weight of the composition.

In one embodiment, the composition does not contain polysilane.

In some embodiments, when present, polysilane may comprise about 9%, 8.7%, 8%, 7.6%, 7%, 6.7%, 6.5%, 6.0%, 5.8%, 5.5%, 5.3%, 5%, 4.7%, 4.5%, 4.3%, 4%, 3%, 2%, 1% (w/w, of the total composition), or any range thereof, of the composition.

For example, in some embodiments, the amount of polysilane present in the composition may range from about 2% to about 3.2%, from 3% to about 4.2%, from about 4% to about 4.8%, from about 4.5% to about 5.1%, from about 4.8% to about 5.4%, from about 4% to about 4.7%, from about 4.5% to about 6.2%, from about 4.8% to about 6.5%, from about 5.1% to about 6.7%, from about 5.4% to about 7%, from about 6.4% to about 7.8%, from about 7.2% to about 8.4%, or from about 8.2% to about 9%, (w/w) of the total composition.

(g) Solvent

The compositions of the current disclosure may additionally include one or more solvents. The solvent may be a polar protic solvent, a polar aprotic solvent, or a nonpolar solvent. Non-limiting examples of suitable protic polar solvents include water; alcohols such as methanol, ethanol, isopropanol, n-propanol, isobutanol, n-butanol, s-butanol, t-butanol, and the like; diols such as propylene glycol; organic acids such as formic acid, acetic acid, and so forth; amides such as formamide, acetamide, and the like; and combinations of any of the above. Non-limiting examples of suitable aprotic solvents include acetone, acetonitrile, diethoxymethane, N,N-dimethylformamide (DMF), dimethyl sulfoxide (DMSO), N,N-dimethylpropanamide (or dimethylpropionamide; DMP), 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, N,N-dimethylacetamide (DMA), N-methyl-2-pyrrolidinone (NMP), 1,4-dioxane, ethyl formate, formamide, hexachloroacetone, hexamethylphosphoramide, methyl acetate, N-methylacetamide, N-methylformamide, methylene chloride, methoxyethane, morpholine, nitrobenzene, nitromethane, propionitrile, pyridine, sulfolane, tetramethylurea, tetrahydrofuran (THF), 2-methyl tetrahydrofuran, tetrahydropyran, trichloromethane, and combinations thereof. Representative nonpolar solvents include, but are not limited to, alkane and substituted alkane solvents (including cycloalkanes), aromatic hydrocarbons, esters, ethers, ketones, and combinations thereof. Specific polar protic solvents that may be employed include, for example, methanol, ethanol, n-propanol, isopropanol, n-butanol, tert-butanol, amyl alcohol, pentyl alcohol, isoamyl alcohol, and combinations thereof. In exemplary embodiments, the solvent may be n-butanol.

In some embodiments, the solvent may be an alcoholic solvent.

In other embodiments, solvent may be selected from the group consisting of methanol, ethanol, n-propanol, isopropanol, n-butanol, tert-butanol, amyl alcohol, pentyl alcohol, and isoamyl alcohol.

In exemplary embodiments, the solvent may comprise methanol, ethanol, and combinations thereof.

In general, the solvent comprises from about 20% to about 98% (w/w) of the total composition.

In other embodiments, the solvent comprises from about 10% to about 60% (w/w) of the composition.

In some embodiments, the solvent may comprise about 98%, about 95%, about 90%, about 85%, about 80%, about 75%, about 70%, about 65%, about 60%, about 55%, about 40%, about 35%, about 30%, about 25%, about 20%, about 15%, or about (w/w) of the total composition.

In exemplary embodiments, the amount of solvent present in the composition may range from about 80% to about 92% (w/w, of the total composition).

In another embodiment, the amount of solvent in the composition may range from about 80% to about 95% (w/w, of the total composition).

In another embodiment, the amount of solvent in the composition may range from about 90% to about 98% (w/w, of the total composition).

In an additional embodiment, the amount of solvent in the composition may range from about 42% to 54% (w/w, of the total composition).

In still another embodiment, the amount of solvent in the composition may range from about 21% to 43% (w/w, of the total composition).

In still another embodiment, the amount of solvent in the composition may range from about 79% to 89% (w/w, of the total composition).

In one embodiment, the amount of solvent in the composition may range from about 10% to 60% (w/w, of the total composition).

In another embodiment, the amount of solvent in the composition may range from about 15% to 20% (w/w, of the total composition).

In still another embodiment, the amount of solvent in the composition may be greater than 10% (w/w, of the total composition).

In yet another embodiment, the amount of solvent in the composition may be less than about 60% (w/w, of the total composition).

(h) Additives

The compositions of the current disclosure may further comprise one or more additives, including, but not limited to curing agents, pigments, tracing dyes, fillers, flow control agents, dry flow additives, anti-cratering agents, surfactants, texturing agents, light stabilizers, matting agents, photosensitizers, wetting agents, anti-oxidants, plasticizers, opacifiers, stabilizers, ceramic microspheres, slip agents, dispersing agents, mica pigments, and surface altering additives. The mica may comprise, for example, black mica.

In some embodiments, the composition may comprise aluminum oxide or fumed silica.

In other embodiments, the composition may comprise a surfactant, such as a Byk™ surfactant. One example of a suitable Byk™ surfactant is Byk™ A-515, a highly surface active air-releasable additive with fiber wetting properties.

In one embodiment, additives typically comprise less than about 30% of the total composition.

In some embodiments, the additive comprises about 30%, about 25%, about 20%, about 15%, about 10%, about 9%, 8%, 7%, 6%, 5%, 4%, 3%, 2%, 1%, 0.1%, or 0% (w/w) of the total composition.

The compositions of the current disclosure may further include one or more organic or inorganic substituents. The optional organic or inorganic substituents may be added to introduce reactive groups into the reaction and thus to the copolymer. For example, by selecting the organochlorosilanes used, the polymerizable side chains of the copolymer may vary. Suitable organochlorosilanes that may be added include, but are not limited to, chloromethylvinylsilane, chlorodivinylsilane, dichloroethylvinylsilane, dichloromethylvinyl-silane, and chloroethylmethyldivinylsilane. The vinyl groups may react with other compounds of low molecular weight that are mixed with the constituents before curing. These changes in the reaction process increase the chain length and the degree of three-dimensional crosslinking of the resulting macromolecule-networks. As a result, they have much higher mass ranges and significantly improved material properties.

In some embodiments of the present disclosure, each polymer in the composition can be cured independently without the need of forming co-polymers.

In other embodiments, substances or mixtures of substances may be added to a resin to promote or control the curing reaction, for example curing agents such as catalysts, enhancers, and hardeners. As is generally known in the art, enhancers increase the rate of a chemical reaction as an initiator. The enhancer is added in a small quantity as compared to the amounts of primary reactants, and may become a component part of the chain.

In contrast, curing hardener, often an amine, enables the formation of a complex three-dimensional molecular structure by chemical reaction between the polymers and the amine. It is essential that the correct mix ratio is obtained between resin and hardener to ensure that a complete reaction takes place, such that no unreacted resin or hardener will remain within the matrix to affect the final properties after cure. Conventional polyamine hardeners comprise primary or secondary amine groups. A polysilazane-modified polyamine hardener was described in U.S. Pat. No. 6,756,469 (incorporated herein by reference), providing heated polyamine in the presence of a polysilazane to prepare a hardener imparting enhanced high temperature properties, higher char yields, and better adhesion properties.

In a particular embodiment, vinyl groups present in the constituents may act as reaction promoters, increasing the rate and extent of polymerization of the coating during curing. The vinyl groups may be present in any one or more of the constituents of the compositions, for example, within the polysilazane, polysiloxane, or polysilane constituent. During polymerization, the vinyl groups are substantially consumed, forming new covalent bonds within crosslinked polymer network of the cured coating. The concentration and distribution of vinyl groups within the coating.

Figure 2:
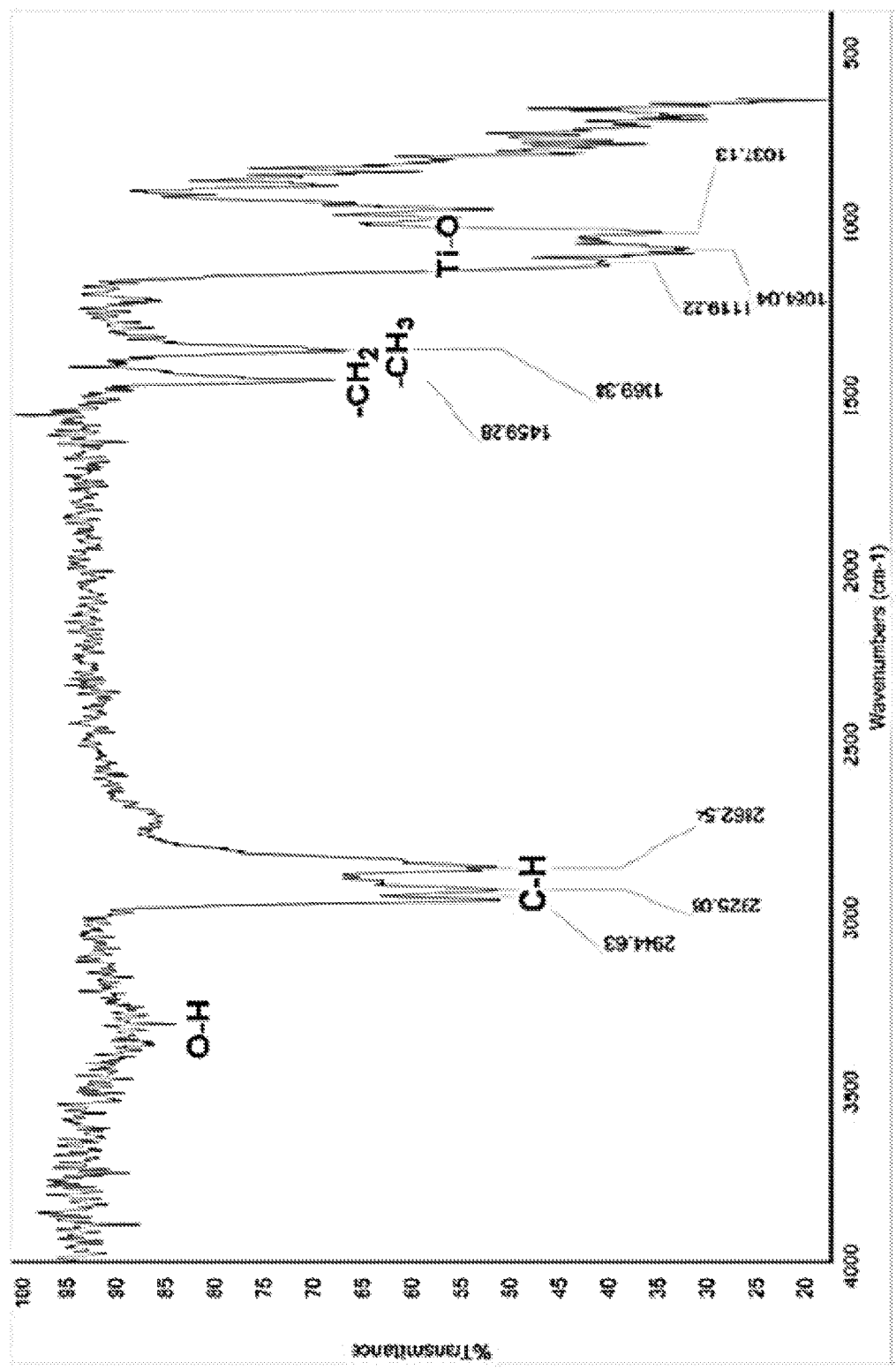
FIG. 2 depicts FTIR spectrum for Tyzor™ BTP polymeric butyl titanate enhancer.

In other embodiments, the enhancer may be an alkyltitanate, such as a polymeric butyltitanate (also referred to as a titanium butanolate polymer), for example Tyzor™ BTP, consisting of 5 to 25 dibutoxytitanate repeating units. The FTIR spectrum for Tyzor™ BTP is depicted at FIG. 2 and indicates low concentrations (<2 ppm) of residual toluene and methanol in the bulk material. The structure of Tyzor™ BTP is shown below:

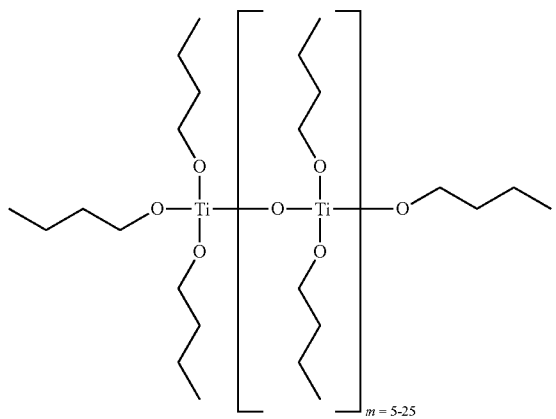

In other embodiments, the alkyltitanate may be a non-polymeric butyltitanate, such as Tyzor™ TnBP. When used, the Tyzor™ TnBP may have a concentration of 0.5 wt. % to 2 wt. % of the total composition. Monomeric butyltitanate results faster curing shortened by about 20 to about 30 minutes compared to using a polymeric butyltitanate, depending on the formulation. The butyltitanate may be provided in a polar solvent, such as an alcohol, for example n-butanol. While the alkyltitanate is non-volatile, n-butanol has a vapor pressure of <7 hPa (<5 mmHg) at 25° C. (77° F.) and is flammable, with a flash point of 68° C. (154° F.). The butyltitanate may be hydrolyzed, rendering the material non-reactive and resulting in non-toxic titanium dioxide. Typically, a detectable amount of water, such as humidity from the atmosphere, allows the butyltitanate to react with a polysiloxane.

The amount of alkyltitanate in the composition can and will vary. Generally, the concentration of alkyltitanate ranges from about 0.1% to about 10% (w/w) of the total composition.

In exemplary embodiments, the concentration of alkyltitanate may range from about 0.1% to about 0.5%, about 0.5% to about 1%, about 1% to about 2%, about 2% to about 3%, about 3% to about 4%, about 4% to about 5%, about 5% to about 6%, about 6% to about 7%, about 7% to about 8%, about 8% to about 9%, or about 9% to about 10% (w/w, of the total composition).

In some embodiments, the alkyltitanate may comprise less than 10% (w/w, of the total composition).

In other embodiments, the alkyltitanate may comprise more than 0.1% (w/w, of the total composition).

In particular embodiments, the concentration of alkyltitanate may range from about 0.1% to about 5% (w/w, of the total composition).

In other particular embodiments, the concentration of alkyltitanate may range from about 2% to about 5% (w/w, of the total composition).

In still other particular embodiments, the concentration of alkyltitanate may range from about 0.5% to about 2% (w/w, of the total composition).

The matting agents used in the practice of this disclosure typically can alter the surface of a coating in such a way that the light falling on it is scattered in a defined fashion. The matting agent particles stand out from the coating, and are invisible to the human eye. The color of the coating is not affected to any great extent. Representative examples of such matting agents include inorganic matting agents such as silica-based Acematt® matting agents from Evonik Degussa (Parsippany, N.J.) and silica-based matting agents available from Ineos Silicas (Hampshire, United Kingdom). The matting agents may vary in size and include materials that are micron sized particles. For example, the particles may have an average diameter of from about 0.1 to 1000 microns, and in one embodiment from 0.1 to 100 microns. Combinations of matting agents may be used.

(II) Method for Forming a Composition

In various embodiments, the present disclosure provides a method for forming a composition. The method commences with step (a), wherein a polysiloxane is dissolved in an alcoholic solvent to form a mixture. The mixture of step (a) may comprise a polysiloxane as described above in section (I)(b).

In particular embodiments, the polysiloxane may comprise the formula $[SiOR^1R^2]_n$; wherein $R^1$ and $R^2$ are independently selected from the group consisting of hydrocarbyl, aryl, hydrocarbylamine, fluorohydrocarbyl, alkoxy, mercapto, chlorohydrocarbyl, and cyano.

In exemplary embodiments, the siloxane may comprise the formula $(CH_3SiO_{1.5})_x(C_6H_5SiO_{1.5})_y$, wherein x and y are each greater than 1. In some embodiments, the composition may comprise from 15% to 60% (w/w, or the total composition) polysiloxane.

The alcoholic solvent in the mixture of step (a) may be as described above in section (I)(f). In particular embodiments, the alcoholic solvent may be selected from the group consisting of methanol, ethanol, n-propanol, isopropanol, n-butanol, tert-butanol, amyl alcohol, pentyl alcohol, and iso-amyl alcohol.

Step (b) of the process commences with adding to the mixture of step (a) at least one boron constituent, such as boric acid, borate, borax, boron oxide, and particulate boron nitride, which has a $d_{50}$ value of less than 1 micron. The boron constituent may be any as described above in section (I)(c). In some embodiments, the method may further comprise adding boric acid to the mixture of step (a). In exemplary embodiments, the composition may comprise from 5% to 20% (w/w, of the total composition) boron constituent.

Step (c) of the process commences with adding an organic acid to the mixture of step (b).

Step (d) of the process commences with optionally adding carbon nanofibers and/or halloysite to the mixture of step (c). The carbon nanofibers may be as described above in section (I)(d), and the halloysite may be as described above in section (I)(e). In exemplary embodiments, the composition may comprise 0.1% to 50% (w/w, of the total composition) carbon nanofibers, such as 0.1% to 1.0% (w/w, of the total composition) carbon nanofibers. In other exemplary embodiments, the composition may comprise 0.1% to 50% (w/w, of the total composition) halloysite, such as 0.1% to 1.0% (w/w, of the total composition) halloysite.

Step (e) of the process commences with adding at least one polysilazane to the mixture of step (d). The polysilazane may be as described above in section (I)(a). In particular embodiments, the composition may comprise from about 2% to about 8% (w/w, of the total composition) silazane. In other embodiments, the composition may further comprise an enhancer or a hardener as described above in section (I)(h).

(III) Processing Compositions

The compositions described herein may be further processed for a variety of applications, including forming coatings and forming composition-fiber composites.

(a) Coatings

Any composition described herein may be applied by dipping, spraying, brushing, painting, wiping, immersion, or spin-coating techniques. These procedures typically provide polymer coatings of thicknesses on the order of 1 µm or thinner, to up to about 75 µm per coat for the cured polymers. If a thicker coating is desired, multiple coating layers may be provided. When the compositions as provided herein result in a transparent coating, the optical appearance of the substrate is unaffected. Due to the small coating thicknesses, only a very small amount of material is required, which is advantageous both in terms of cost and also ecologically, and the weight change of the substrate to be coated is nearly unnoticeable.

The coating thickness of the coating as provided herein following evaporation of the solvent and curing is in the range from about 0.1 µm to about 50 µm. In some embodiments the coating thickness is from about 0.5 µm to about 40 µm.

In some embodiments, the coating thickness is from about 0.1 µm to about 25 µm.

In some other embodiments, the coating thickness is from about 1 µm to about 3 µm.

Coating-related testing provides quality control and product description based on industrial standards. Typical coating tests may include, but not be limited to, testing thickness, coefficient of friction, hardness, scratch resistance, the amount of force needed to scratch the coating from substrate; 90 degree peel from topcoat test; 90 degree peel from adhesive test; cross-hatch adhesion test; UV endurance test; heat stability test; conical bend test, impact direct and indirect test. In particular, thickness test, measuring the thickness of substrates and top-coated materials, may be carried out using test panels on which uniform films are produced by a coating suitable for spraying; using micrometers for dried films; using magnetic gauges for nonmagnetic coatings; using Wet Film Thickness Gauge or Pfund Gauge for wet film thickness; or using microscopic observation of precision angular cuts in the coating film. Hardness test of organic materials may be carried out using indentation hardness measurements, Sward-type hardness rocker instruments, or pendulum damping testers.

In addition, the "kinetic coefficient of friction" (COF, µ), also known as a "frictional coefficient" or "friction coefficient", describes the ratio of the force of friction between two bodies and the force pressing them together. Coefficients of friction range from near zero to greater than one. Rougher surfaces tend to have higher effective values. The COF measured under ASTM D1894 is called Standard COF. More standard ASTM (American Society for Testing and Materials) test methods for coatings are available at http://wernerblank.com/polyur/testmethods/coating_test.htm.

In one embodiment, the thickness of the coating resulted from the compositions provided herein may be between from about 0.1 µm to about 45 µm.

In one embodiment, the hardness of the coating resulted from the compositions provided herein may range from about 4H to about 9H, using ASTM D3363.

Further, in one embodiment, the COF of the coating resulted from the compositions provided herein may be between from about 0.03 to about 0.04.

Surfaces, substrates and substrate layers suitable for compositions provided herein may comprise any desirable substantially solid material that varies widely. For example, the type of surfaces that can be treated with the compositions of this disclosure includes glass; fiberglass; carbon fiber composites; basalt fiber composites; siloxane and ceramic fibers; ceramics, such as, silicon nitride, silicon carbide, silica, alumina, zirconia, and the like; metals, such as, for example, iron, stainless steel, galvanized steel, zinc, aluminum, nickel, copper, magnesium and alloys thereof, silver and gold and the like; plastics, such as, polymethylmethacrylate, polyurethane, polycarbonate, polyesters including polyethylene terephthalate, polyimides, polyamides, epoxy resins, ABS polymer, polyethylene, polypropylene, polyoxymethylene; porous mineral materials, such as, concrete, clay bricks, marble, basalt, asphalt, loam, terracotta; organic materials, such as wood, leather, parchment, paper and textiles; and coated surfaces, such as, plastics emulsion paints, acrylic coatings, epoxy coatings, melamine resins, polyurethane resins and alkyd coatings. The surface or substrate contemplated herein may also comprise at least two layers of materials. One layer of material, for example, may include glass, metal, ceramic, plastics, wood or composite material. Other layers of material comprising the surface or substrate may include layers of polymers, monomers, organic compounds, inorganic compounds, organometallic compounds, continuous layers, porous and nanoporous layers.

Further, the surfaces and substrates may have different shapes, e.g., substrates having flat, planar surfaces, molded articles having curved surfaces, fibers, fabrics, and the like. It will be appreciated by those skilled in the art that the foregoing lists are merely illustrative of various materials which may be coated using the presently disclosed compositions and methods, and are not in any way limiting of the different substrates with which the present disclosure is useful. Insofar as they protect virtually any type of substrate from oxidative thermal degradation, corrosion, or chemical attack. The coatings may also be used to strengthen relatively flaw sensitive brittle substrates such as glass and non-wetting surfaces. The coatings may additionally be useful to provide bonding or compatibility interfaces between different types of materials.

A particularly advantageous, but non-limiting, use of this coating is for surfaces that undergo high pressure and temperature, and multiple pulls. A protective film provided by the compositions disclosed herein over the base layer of paint or surface material of these surfaces is particularly useful to provide long lasting protection, in comparison to other materials in market, from various external forces, which can be destructive over a period of time.

Other advantageous, but non-limiting, use of the coatings provided herein is to coat on automobile, aircraft, missiles, aerospace components, marine vessels, wheels, wind generation equipment and blades, engine shrouds, car exhausts, smoke stacks, industrial kilns, combustion chambers, industrial duct and pipe systems, solar panels, electronic components, fire and safety appliance, insulation and energy systems, building surfaces, public spaces, packaging surfaces, outdoor signs and advertisement billboard or LED screens, food- and beverage-processing equipment, cookware and containers. Those surfaces are exposed to UV, heat, coldness, moisture, ice build-up, chemical corrosion, and wear and tear from natural physical forces creating friction such as, water, air flow and dust. In addition, such protection is particularly suitable for mechanical components exposed to high temperatures, including, for example, exterior aircraft surfaces, a wing slat or pylon made of titanium, aluminum or cress metal; heat shields on an aircraft or other coated aircraft areas subject to engine efflux. A protective film provided by the compositions disclosed herein over the base layer of paint or surface material of these surfaces is particularly useful to protect the surface and the substrate material from various external forces, particularly from the heat and high temperature, by greatly reducing radiant heat passing through the surface and the substrate material.

The cured coating is formed from any of the compositions described herein, and may be cured by any disclosed method, particularly by exposing the substrate coated with a composition to ambient conditions at room temperature for about 24 hours. Within the cured coating, silicon-based substituents and boron constituents are substantially completely reacted to form new covalent bonds to each other and to the substrate. Furthermore, if the composition contained substituents bearing vinyl groups, the C=C bonds are also consumed in the formation of new covalent bonds. Overall, without wishing to be bound by theory, the coating comprises a crosslinked polymer network comprising Si—O, Si—N, and Si—C bonds, especially when both the Si—N and the Si—O bonds are part of the same polymer network within the coating. In some embodiments, the coating may also be substantially free of ammonia, free amines, or ammonium chloride. The crosslinked polymer may provide a durable and hard coating, as described throughout this specification.

(b) Composition-Fiber Composites

Any composition described herein may be used to produce a composition-fiber composite. In some embodiments, the method for forming a composition-fiber composite comprises providing a composition comprising polysilazane, polysiloxane, and a boron constituent, as described herein. The method further comprises mixing the composition with fibers, and curing the composition-fiber mixture under vacuum at a temperature of 200° F. to 450° F. for 30 minutes to 180 minutes to form a composite. The composition may be any composition as described herein, for example above in sections (I) and (II).

Fibers that may be used to from composite structure include, but are not limited to, basalt, e-glass, glass ribbon, fiberglass, quartz, ceramic, and the like. In some embodiments, fibers may be woven into a fabric, or may be in the form of a mesh, felt, needle-punched felt, or cloth tape. In other embodiments, fibers may be unidirectional. In another embodiment, fibers may be chopped.

Composition-fiber composites may be used to form thermally insulated panels. Insulating materials may include, but are not limited to, vermiculite, hollow glass, or ceramic spheres. In some embodiments, ceramic spheres may be Zeospheres™, produced by a spinoff of 3M, which average 4 microns in particle size, have high strength (60,000 psi compressive strength), are hard and inert.

The application method of the composition wets the fibers. The ratio of fibers to composition may be from about 1:99 to about 99:1 by weight, such as approximately 65:35 to about 55:45 by weight. This ratio of fibers to composition is commonly used within the industry for creating an acceptable strength to weight ratio.

Further, the surfaces may have different shapes, e.g., substrates having flat, planar surfaces, molded articles having curved surfaces, fibers, fabrics, and the like. It will be appreciated by those skilled in the art that the foregoing lists are merely illustrative of various materials, which may be used with the presently disclosed compositions and methods, and are not in any way limiting of the different materials with which the present disclosure is useful.

The composition may be used as-is and is used at low temperature, averaging from room temperature to just below the composition's catalyzing temperature. Heating may be under ambient atmosphere, vacuum, or inert atmosphere.

Once the fibers are wetted with composition, they may be B-staged; that is, the wetted fibers may be partially cured, leaving a drier but sticky composition film within the fibers. Alternatively, in some embodiments, the fibers may be left wet without partial curing.

Before full curing, the wetted or B-staged fibers may be stacked, rolled, or left as single pieces, depending on the intended shape or use of the final product. Alternatively, in some embodiments, the composition may be applied to single or multiple fibers and then wound around various shapes and configurations of mandrel shapes by machine or hand to create hollow tubes, boxes, channels, tanks, and the like.

Once the fibers are shaped, they must be cured. In some embodiments, curing may occur at an elevated temperature. In other embodiments, the wetted fibers may be placed, for example, in an oven, under a hot press, or in autoclave at a set temperature. In one embodiment, the temperature may be selected to vary the reaction time/speed of the composition desired and/or to adjust the cure time desired. In some embodiments, various methods of preparing the composition-infused fabric parts for the cure cycle are possible, such as, for example, vacuum bagging, shrink tape wrap, pre-designed male-to-female mold sets, squeeze plates, and the like.

Although the disclosure described herein is susceptible to various modifications and alternative iterations, specific embodiments thereof have been described in greater detail above. It should be understood, however, that the detailed description of the composition is not intended to limit the disclosure to the specific embodiments disclosed. Rather, it should be understood that the disclosure is intended to cover all modifications, equivalents, and alternatives falling within the spirit and scope of the disclosure as defined by the claim language.

Definitions

As used herein, the terms "about" and "approximately" designate that a value is within a statistically meaningful range. Such a range can be typically within 20%, more typically still within 10%, and even more typically within 5% of a given value or range. The allowable variation encompassed by the terms "about" and "approximately" depends on the particular system under study and can be readily appreciated by one of ordinary skill in the art.

As used herein, the term "w/w" designates the phrase "by weight," "weight percent," or "wt. %," and is used to describe the concentration of a particular substance in a mixture or solution.

As used herein, the term "ml/kg" designates milliliters of composition per kilogram of formula weight.

As used herein, the term "cure" or "curing" refers to a change in state, condition, and/or structure in a material that is usually, but not necessarily, induced by at least one variable, such as time, temperature, moisture, radiation, presence and quantity in such material of a catalyst, enhancer, accelerator or the like. The terms cover partial as well as complete curing.

As used herein, the term "hardness" or "H" designates the property of a material that enables it to resist plastic deformation, usually by penetration. However, the term hardness may also refer to resistance to bending, scratching, abrasion or cutting. The usual method to achieve a hardness value is to measure the depth or area of an indentation left by an indenter of a specific shape, with a specific force applied for a specific time. There are four principal standard test methods for expressing the relationship between hardness and the size of the impression, these being Pencil Hardness ASTM D3363, Brinell, Vickers, and Rockwell. For practical and calibration reasons, each of these methods is divided into a range of scales, defined by a combination of applied load and indenter geometry.

As used herein, the term "coefficient of friction" (COF), also known as a "frictional coefficient" or "friction coefficient" or "kinetic coefficient of friction" and is an empirical measurement which describes the ratio of the force of friction between two bodies and the force pressing them together. The coefficient of friction depends on the materials used. When the coefficient of friction is measured by a standardized surface, the measurement is called "standardized coefficient of friction".

As used herein, the term "corrosion resistant agent" or variation thereof refers to additives in the coating on a surface which inhibit the corrosion of the surface substrate when it is exposed to air, heat, or corrosive environments for prolonged time periods.

By "oligomer" is meant any molecule or chemical compound which comprises several repeat units, generally from about 2 to 10 repeat units. "Polymer" or "copolymer", as used herein, means a molecule or compound which comprises a large number of repeat units, generally greater than about 10 repeat units.

As used herein, the term "monomer" refers to any chemical compound that is capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "blockpolymers." Monomers may belong to various chemical classes of molecules including organic, organometallic or inorganic molecules. The molecular weight of monomers may vary greatly between about 40 Daltons and 20,000 Daltons. However, especially when monomers comprise repetitive building blocks, monomers may have even higher molecular weights. Monomers may also include additional reactive groups.

Contemplated polymers may also comprise a wide range of functional or structural moieties, including aromatic systems, and halogenated groups. Furthermore, appropriate polymers may have many configurations, including a homopolymer, and a heteropolymer. Moreover, alternative polymers may have various forms, such as linear, branched, super-branched, or three-dimensional. The molecular weight of contemplated polymers spans a wide range, typically between 400 Daltons and 400,000 Daltons or more.

"Prepolymer" refers to polymeric structures formed by the processes in the present disclosure are long term-stable liquids, and possess only moderate odors, which mostly arise from the use of organic solvents. In the solid form, these polymerized materials may be handled similarly to thermosetting or thermoplastic processes. Molecular weight may vary from about 2,000 g/mol up to as much as 100,000 g/mol, depending on process. The density of the prepolymers is normally around 1 g/cm$^3$.

The polymerization processes include, but are not limited to, step-growth polymerization, polyaddition, and polycondensation. More specifically, polymerization can be initiated by mechanisms, such as acid- or base-catalysis, or free radical polymerization. It may comprise ring-opening copolymerization, and the formation of inorganic and/or organic polymer networks. The actual mechanisms of polymerization depend on the functional groups of the reacting polymeric and monomeric compounds, as well as inherent steric effects. Conceptually new materials can be formed by adding non-conventional starting materials into the polymerization process, such as ammonia.

The compounds described herein may have asymmetric centers. Compounds of the present disclosure containing an asymmetrically substituted atom may be isolated in optically active or racemic form. All chiral, diastereomeric, racemic forms and all geometric isomeric forms of a structure are intended, unless the specific stereochemistry or isomeric form is specifically indicated.

The term "acyl," as used herein alone or as part of another group, denotes the moiety formed by removal of the hydroxy group from the group COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "allyl," as used herein not only refers to compound containing the simple allyl group ($CH_2$=CH—$CH_2$—), but also to compounds that contain substituted allyl groups or allyl groups forming part of a ring system.

The term "alkyl" as used herein describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

The term "alkenyl" as used herein describes groups which are preferably lower alkenyl containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The terms "aryl" or "Ar" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl.

The terms "carbocyclo" or "carbocyclic" as used herein alone or as part of another group denote optionally substituted, aromatic or non-aromatic, homocyclic ring or ring system in which all of the atoms in the ring are carbon, with preferably 5 or 6 carbon atoms in each ring. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "halogen" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The term "protecting group" as used herein denotes a group capable of protecting a particular moiety, wherein the protecting group may be removed, subsequent to the reaction for which the protection is employed, without disturbing the remainder of the molecule. Where the moiety is an oxygen atom (and hence, forming a protected hydroxy), exemplary protecting groups include ethers (e.g., allyl, triphenylmethyl (trityl or Tr), p-methoxybenzyl (PMB), p-methoxyphenyl (PMP)), acetals (e.g., methoxymethyl (MOM), β-methoxyethoxymethyl (MEM), tetrahydropyranyl (THP), ethoxy ethyl (EE), methylthiomethyl (MTM), 2-methoxy-2-propyl (MOP), 2-trimethylsilylethoxymethyl (SEM)), esters (e.g., benzoate (Bz), allyl carbonate, 2,2,2-trichloroethyl carbonate (Troc), 2-trimethylsilylethyl carbonate), silyl ethers (e.g., trimethylsilyl (TMS), triethylsilyl (TES), triisopropylsilyl (TIPS), triphenylsilyl (TPS), t-butyldimethylsilyl (TBDMS), t-butyldiphenylsilyl (TBDPS) and the like. When the moiety is an nitrogen atom (and hence, forming a protecting amine) exemplary protecting groups include benzyl, p-methoxyphenyl (PMP), 3,4-dimethoxybenxyl (PMB)), n-silyl groups, esters (e.g., benzoate (Bz), carbonyl (e.g. p-methoxybenzyl carbonyl (Moz), tert-butyloxycarbonyl (BOC), 9-fluorenylmethyloxycarbonyl (FMOC)), acetyl, carbamates, n-silyl groups and the like. A variety of protecting groups and the synthesis thereof may be found in "Protective Groups in Organic Synthesis" by T. W. Greene and P. G. M. Wuts, John Wiley & Sons, 1999.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

When introducing elements of the present disclosure or the exemplary embodiments(s) thereof, the articles "a", "an", "the" and "said" are intended to mean that there are one or more of the elements. The terms "comprising", "including" and "having" are intended to be inclusive and mean that there may be additional elements other than the listed elements.

Unless otherwise defined, all technical and scientific terms used herein have the same meaning as is commonly understood by one of skill in the art to which this disclosure belongs at the time of filing. If specifically defined, then the definition provided herein takes precedent over any dictionary or extrinsic definition. Further, unless otherwise required by context, singular terms shall include pluralities, and plural terms shall include the singular. Herein, the use of "or" means "and/or" unless stated otherwise. All patents and publications referred to herein are incorporated by reference.

EXAMPLES

The following examples are intended to further illustrate and explain the present disclosure. The disclosure, therefore, should not be limited to any of the details in these examples.

Example 1—Preparation of Compositions

A composition was formed to study its properties in forming composites with compositions. To form the composition, dry flake Techneglas™ GR-908F (29 wt. %) was dissolved in n-butanol, resulting in a mixture with the consistency of heavy syrup. The siloxane may be allowed to dissolve without agitation or may be blended by stir stick or power paddle-type mixers until a uniform smooth liquid blend is achieved.

To this mixture was added boric acid and boron nitride ground to a submicron particle size (10 wt. %). The mixture was stirred until uniform.

Next 95% formic acid (2 wt. %) was added and stirred until the mixture was uniform. The formic acid shortened cure time, lessened the temperature required for curing, and improved the cured properties of the composition. The typical cure temperature was 350° F. for 1 to 2 hours, depending on the weight ratios of constituents in the composition.

To this mixture was then added carbon nanofibers (0.5 wt. % PR-24PS, Pyrograf Products Inc. Cedarville, Ohio) and stirred until the mixture was uniform. Nanofibers added strength to the resin-to-resin structure and improved the resin-to-fiber bonds.

To this mixture was added DT-6062 (2 wt. %), a proprietary polysilazane mixture from Dyna-Tek, Kansas City, Mo., and stirred until the mixture was uniform. DT-6062 aided composition strength, resistance to thermal degradation, and strengthened bonds to the fibers within woven or non-woven fabrics.

To this mixture, was added DT-6063 (2 wt. %), a second proprietary polysilazane mixture from Dyna-Tek, Kansas City, Mo., and stirred until the mixture uniform. DT-6062 also aided resin strength, thermal degradation resistance, and provided stronger bonds to the fibers within the woven or non-woven fabrics.

Example 2—Composition-Fiber Composites from the Composition of Example 1

The composition described in Example 1 may be used as a one-component product to form composition-fiber composites. The composition may be wetted into woven or non-woven fabrics, such as carbon fiber, quartz fiber, basalt fiber, glass fiber, etc., by brush, squeegee, or other mechanical means. The w/w ratio of composition to fiber may vary according to need, although standard industry ratios of 35% to 45% are typically adequate for composite lay-ups.

Once the composition is wetted into the fibers it may be B-staged under ambient atmosphere without additional heat. Once the surface becomes tacky, the B-staged composition-fiber mixture is placed between plastic release sheets and refrigerate for long-term storage. Before use the prepreg fabric is allowed to reach room temperature. The prepreg fabric may also be placed directly into a hot press or mold tool and cured in an oven or autoclave at 350° F. Tests showed that the composite formed from the composition of Example 1 withstood repeated exposures to 2000° F. without burn through, which is flame abrasion cutting through or exiting the opposite side of the flame source.

A composite tube was made from the composition of Example 1 and a 3K woven carbon fiber fabric. The tube had a 2.0" in diameter and a wall thickness of 0.0625". During testing, the fabric of the composite maintained its structure while a 1800° F. flame heat source passed through the lumen of the composite tube. At the same time, the composite tube exhibited a radiated temperature of only 285° F. at a distance of ⅛" from the tube's outer surface; that is, the outside of the composite tube was about 1,500° F. cooler than the flame heat in the lumen of the tube.

Example 3—Other Constituents for the Composition

Other constituents may be used in the composition of Example 1. For example, Dow Corning US-CF™ 2403 resin, a methyl-methoxy functionalized liquid siloxane without solvent and having a low molecular weight, may be included. Another possible constituent to the composition of Example 1 is Dorf Kettle Specialty Catalysts, LLC Tyzor™ BTP (1-Butanol, titanium(+4) salt(4:1) homopolymer), which functions as a polymerization enhancer in the composition. Yet another possible constituent is Dow Corning Xiameter™ 6020, an aminoethylaminopropyltrimethoxysilane ($H_2NC_2H_4NHC_3H_6$—$Si(OCH_3)_3$) coupling agent that may be used in thermoset and thermoplastic resins with glass or mineral fillers. In particular, Tyzor™ or US-CF™ 2403 may be used in conjunction with a Silres™ MSE-100 resin for cookware and composition-fiber composites.

The advantages of the above constituents include a lack of offensive odors, such as an ammonia smell; nonviolent reaction when mixed with epoxies, silicone bases, Techneglas™ products, and the like; hardness, heat resistance, chemical resistance, and strong bonds to the substrate; single-component versus two-component systems; reduced unit cost; aided adhesion to substrate; resistance to intense, direct flame and radiant heat; and ambient cure or oven-cure without solvent.

Figure 3:
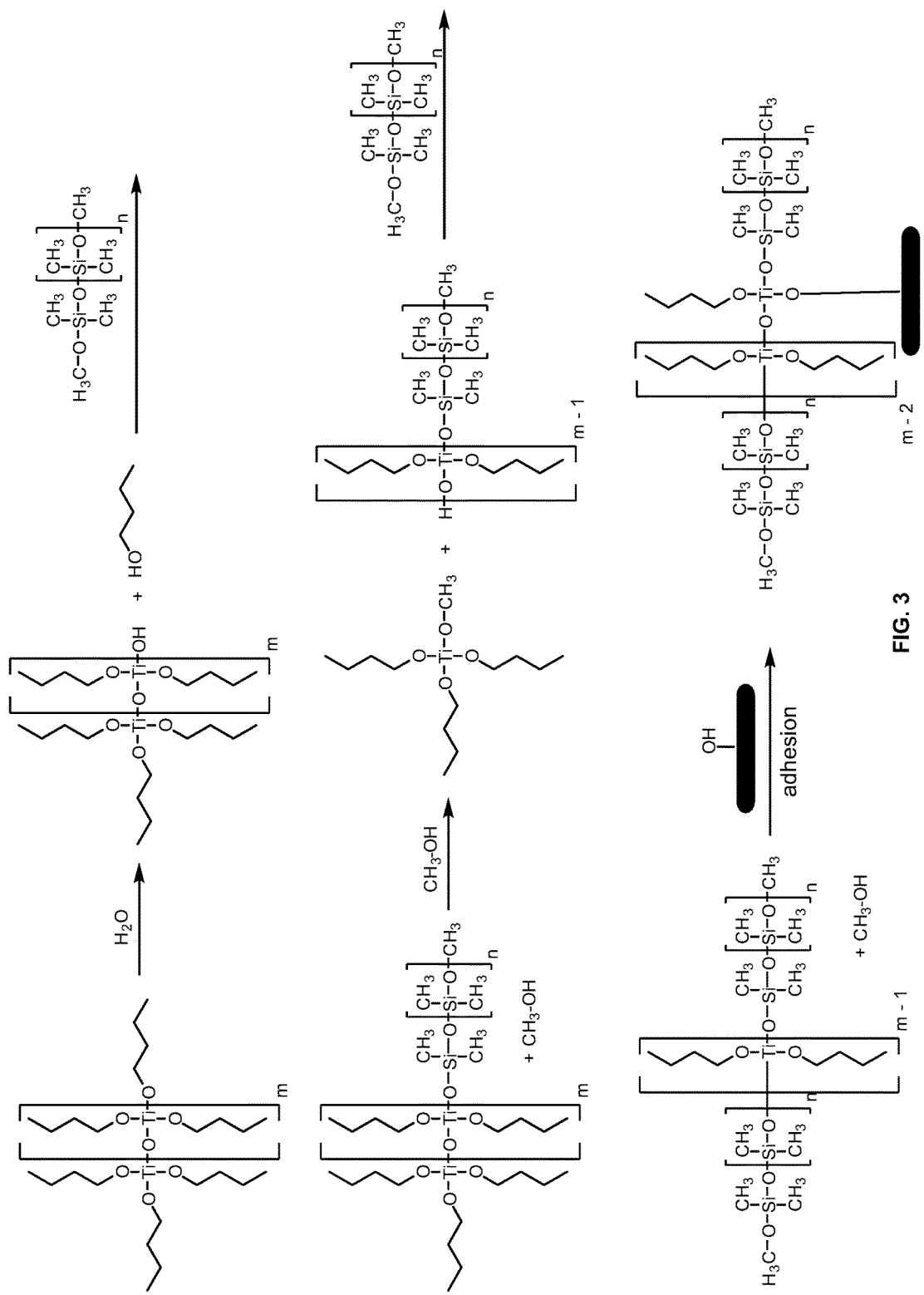
FIG. 3 depicts a proposed reaction of the Tyzor™ BTP catalyzed polymerization of a Silres® siloxane.

FIG. 3 depicts a proposed reaction of the Tyzor™ BTP catalyzed polymerization of a Silres™ siloxane, which relies on water. Water may come from the air or the Silres™ siloxane itself. The moisture level may also vary from batch to batch and may decrease with the age of the Silres™ siloxane.

Figure 4:
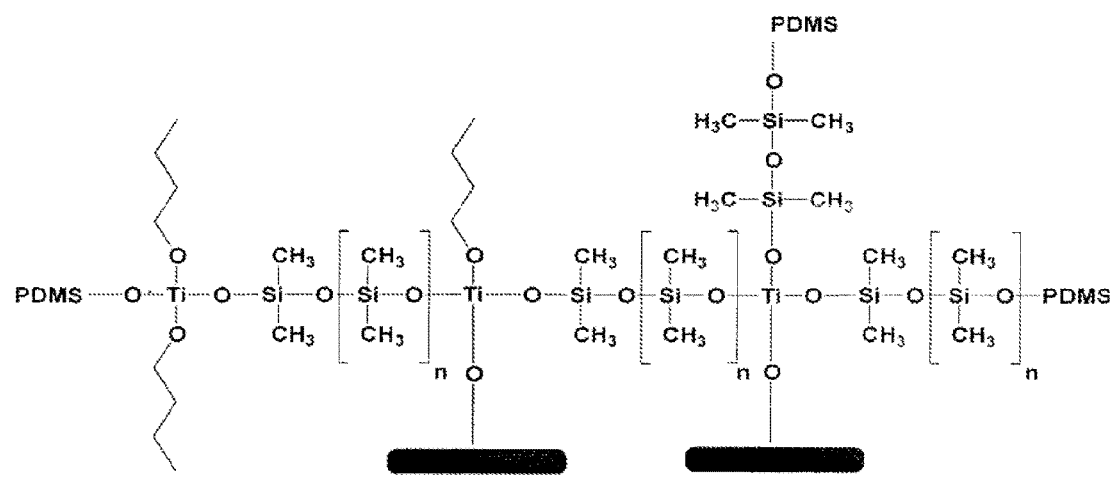
FIG. 4 depicts a compound resulting from the reaction of Tyzor™ BTP with a Silres® siloxane.

FIG. 4 depicts a compound resulting from the reaction of Tyzor™ BTP with a Silres™ siloxane as depicted in FIG. 3.

Figure 5:
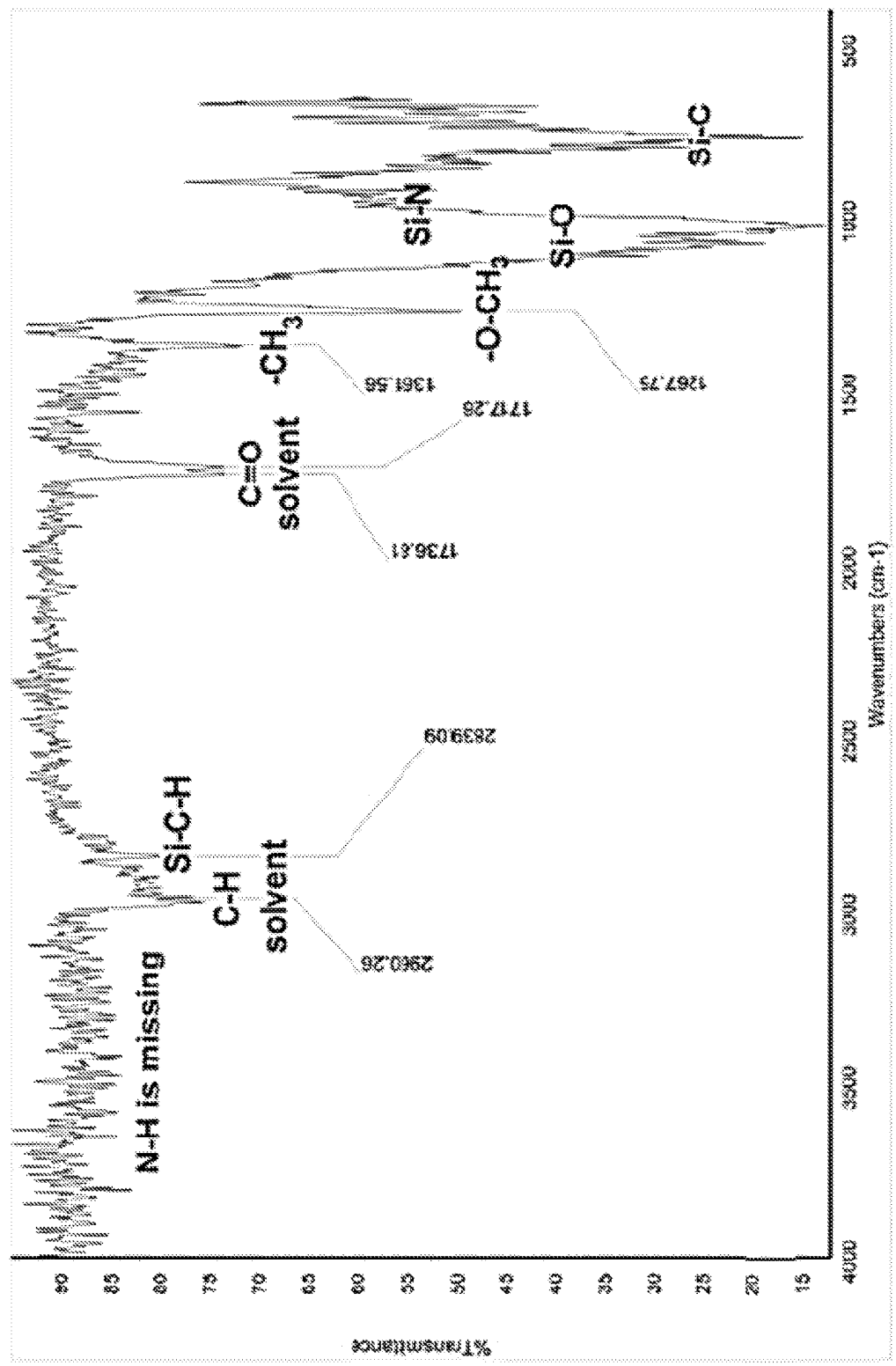
FIG. 5 depicts the FTIR spectrum for N-[3-(trimethoxysilyl)propyl]ethylenediamine after reaction with a compound resulting from the reaction of Tyzor™ BTP with a Silres® (depicted in FIG. 4).
Figure 6:
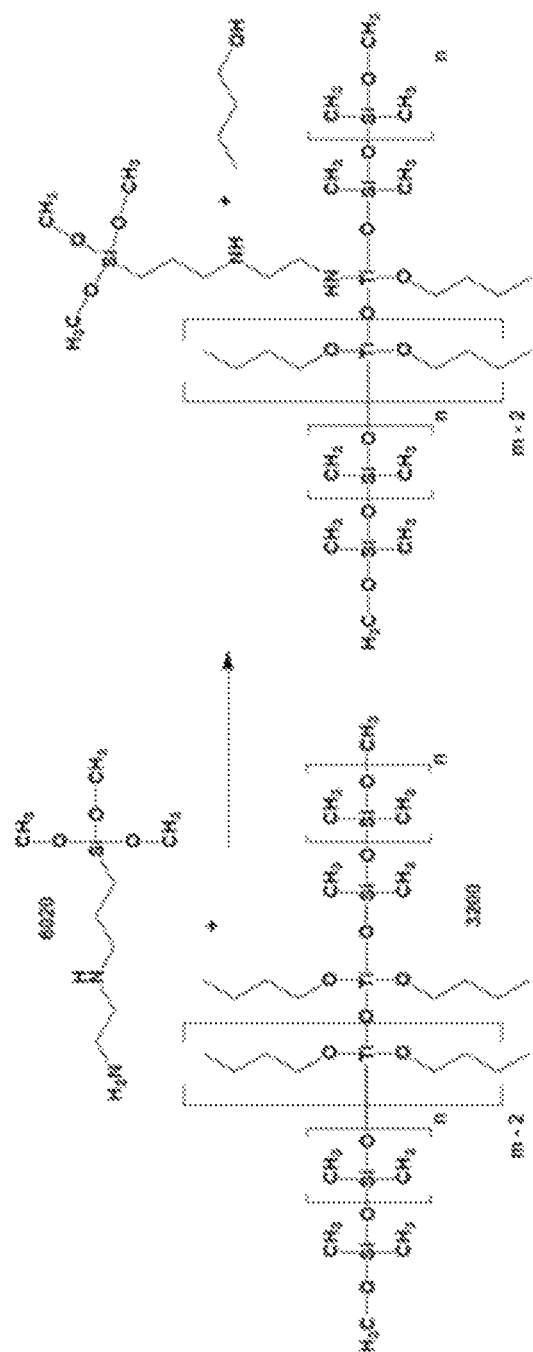
FIGS. 6-8 depict proposed reactions between the compound resulting from the reaction of Tyzor™ BTP with a Silres® siloxane (as depicted in FIG. 4) and N-[3-(trimethoxysilyl)propyl]ethylenediamine.
Figure 7:
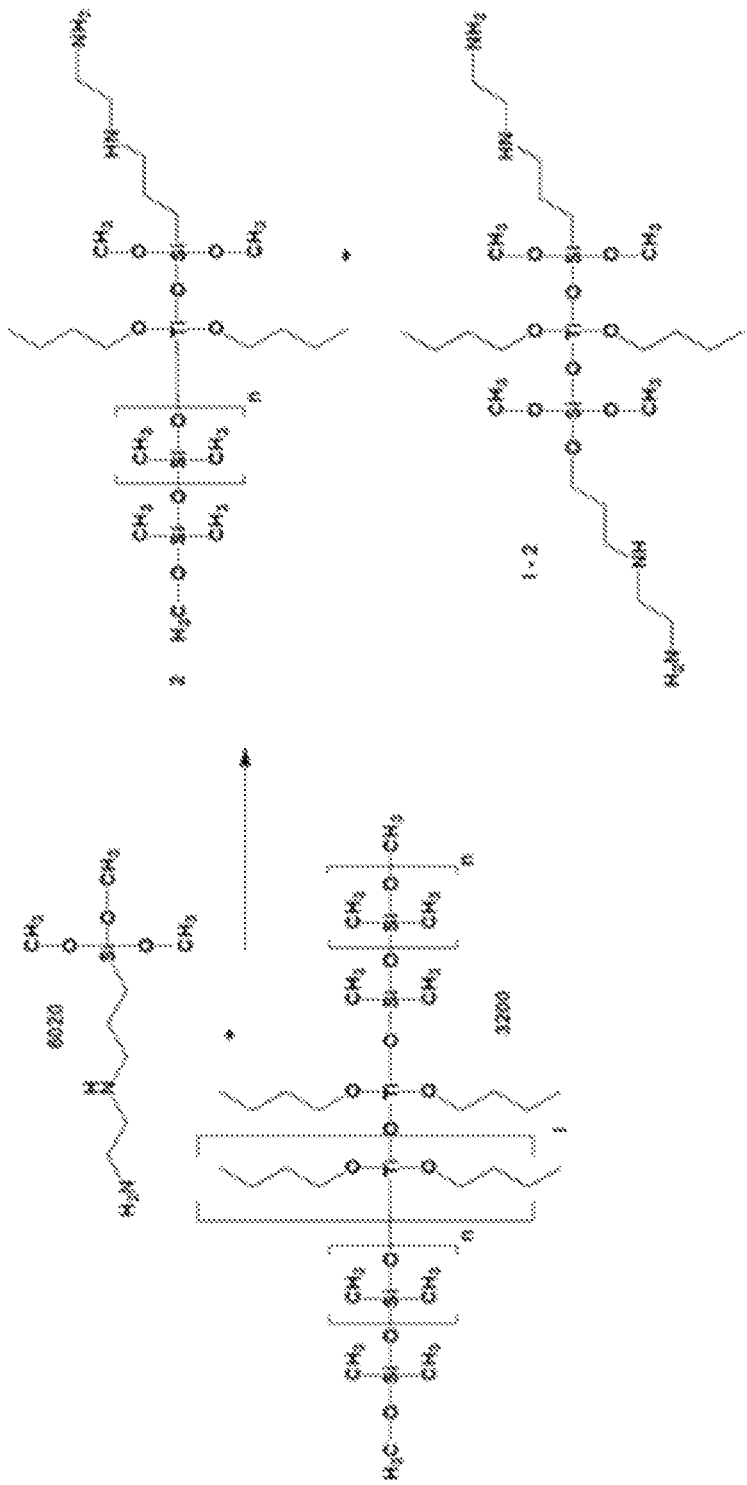
Figure 8:
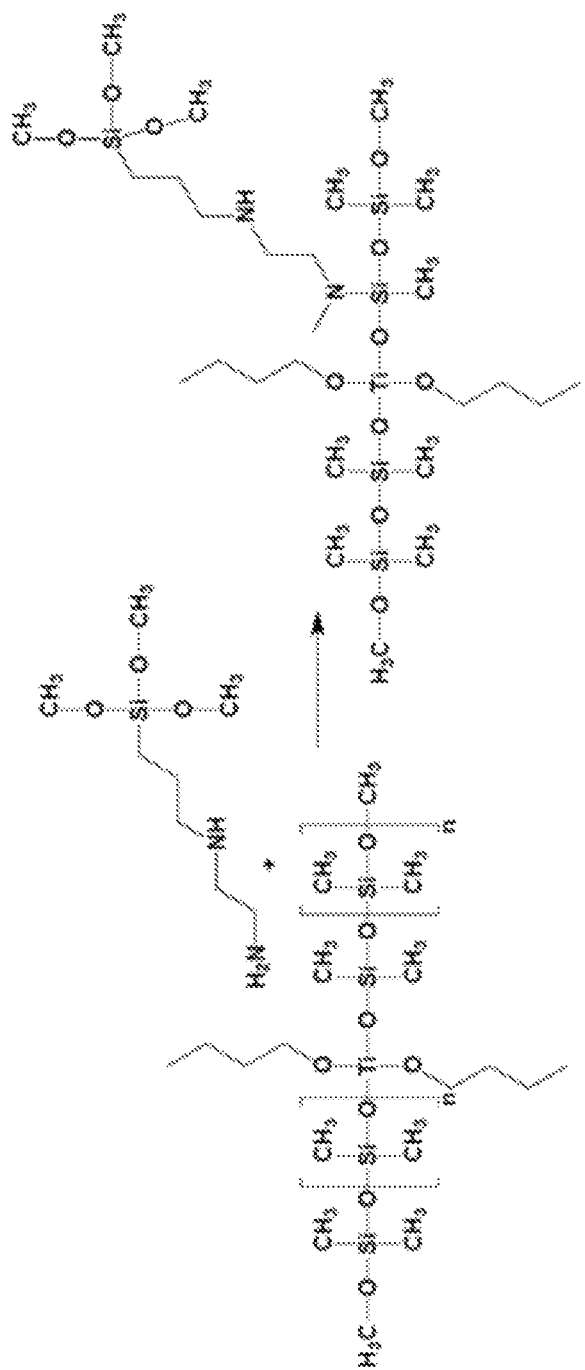

FIG. 5 depicts the FTIR spectrum for N-[3-(trimethoxysilyl)propyl]ethylenediamine after reaction with the compound resulting from the reaction of Tyzor™ BTP with a Silres™ siloxane. The lack of N—H stretches indicates that the aliphatic amines, including both the primary and secondary amine, react with the n-butylate groups of the Tyzor™ BTP-induced titanate bridges, inducing further branching reactions as depicted in FIGS. 6-8.

The Si—O—$CH_3$ groups reacted with the Ti—O—Ti centers that remained, rendering the material more reactive. The FTIR spectrum indicates newly formed Si—N bonds; therefore, the reaction depicted in FIG. 8 may occur during the formation of stable coatings. This reaction enhanced the reactivity of the mixture during the curing process. The reactions of FIGS. 6-8 led to the formation of a more closely interwoven network. In addition, the reaction is pH-dependent, and it catalyzed by the presence of bases, such as N-[3-(trimethoxysilyl)propyl]ethylenediamine. Therefore, increasing the concentration of N-[3-(trimethoxysilyl)propyl]ethylenediamine accelerates the hardening reaction, especially at room temperature.

Example 4—Method for Forming Composition-Fiber Composites

Composition-fiber composites were formed from compositions disclosed herein. Generally, the composition-fiber composites were formed into 4-ply panels by wetting a carbon fiber fabric with a composition formed using a mixture of A-side and B-side mixture. The term "parts" designates equivalent parts by weight. The wetted fabric was laid up on a mold surface, put under vacuum bag and a vacuum pulled on it, then put into the convection oven or an autoclave ramped up to the 350° F. for 1 hour. After the first hour of curing, the composition-fiber composite was further cured for one hour in a free air convection oven.

In Composite 1, the A-side mixture comprised 100 parts GR-908F resin (Techneglas), 78 parts denatured alcohol, 26 parts boric acid, 3 parts formic acid, and 3 parts aluminum oxide C or Cabot 5760 fumed silica. The B-side mixture of Composite 1 comprised 100 parts Silres™ MK powdered resin (Wacker), 45 parts denatured alcohol, 23 parts Silres™ SY 409 resin, 20 parts DT-6060 (Dyna-Tek proprietary composition), 10 parts black mica, and 1 part carbon nanofibers. The composition of Composite 1 is capable of being furnished as a one-component material.

Composite 2 was prepared in the same way as Composite 1 but with 5 parts Tyzor™ TnBP added just before wetting into the fabric. The A-side of Composite 2 was the same as the A-side of Composite 1 described above. The B-side of Composite 2 comprised 100 parts Silres™ MK powdered resin, 45 parts denatured alcohol, 23 parts Silres™ SY 409 resin, 20 parts DT-6060, 10 parts black mica, 1 part carbon nanofibers, 5 parts Tyzor™ TnBP. Unlike the composition of Composite 1, the composition of Composite 2 should be packed as a two-component system to avoid premature curing.

Composite 3 was formed from a composition using A-side and B-side mixtures. The A-side of Composite 3 was the same as the A-side of Composite 1 described above. The B-side of Composite 3 comprised 100 parts Silres™ MSE-100 resin, 23 parts Silres™ SY 409 resin, 20 parts DT-6060, 5 parts Tyzor™ TnBP, 3 parts Dow Corning™ 3074 intermediate, and 3 parts Byk™ A-515 surfactant. Dow Corning™ 3074 intermediate is a methoxy-functional, solventless liquid silicone resin which chemically reacts with organic resins that contain active hydroxyl groups to form silicone-organic copolymer, or which can self-condense to produce cured, silicone homopolymers. Byk™ A-515 is a highly surface active air-releasable additive with fiber wetting properties. Composite 3 did not comprise mica or carbon nanofibers, which provided a clearer visual of the composition-fiber matrix and permitted vacuum infusion of the composition into a stack of precut fiber fabric. Like the composition of Composite 2, the composition of Composite 3 should be packed as a two-component system to avoid premature curing.

Composite 4 was formed from a composition using A-side and B-side mixtures. The A-side of Composite 4 was the same as the A-side of Composite 1 described above. The B-side of Composite 4 comprised 100 parts Silres™ MK powdered resin, 45 parts denatured alcohol, 23 parts Silres™ SY 409 resin, 20 parts DT-6060 (Dyna-Tek), 10 parts black mica, 1 part carbon nanofibers, 30 parts Dow Corning™ 3055 resin, and 3 parts Dow Corning™ 3074 intermediate. Dow Corning™ 3055 resin is high-solids, liquid, amine-functional polysiloxane resin, which does not require the presence of a titanate or tin catalyst or moisture for curing to happen.

Figure 9:
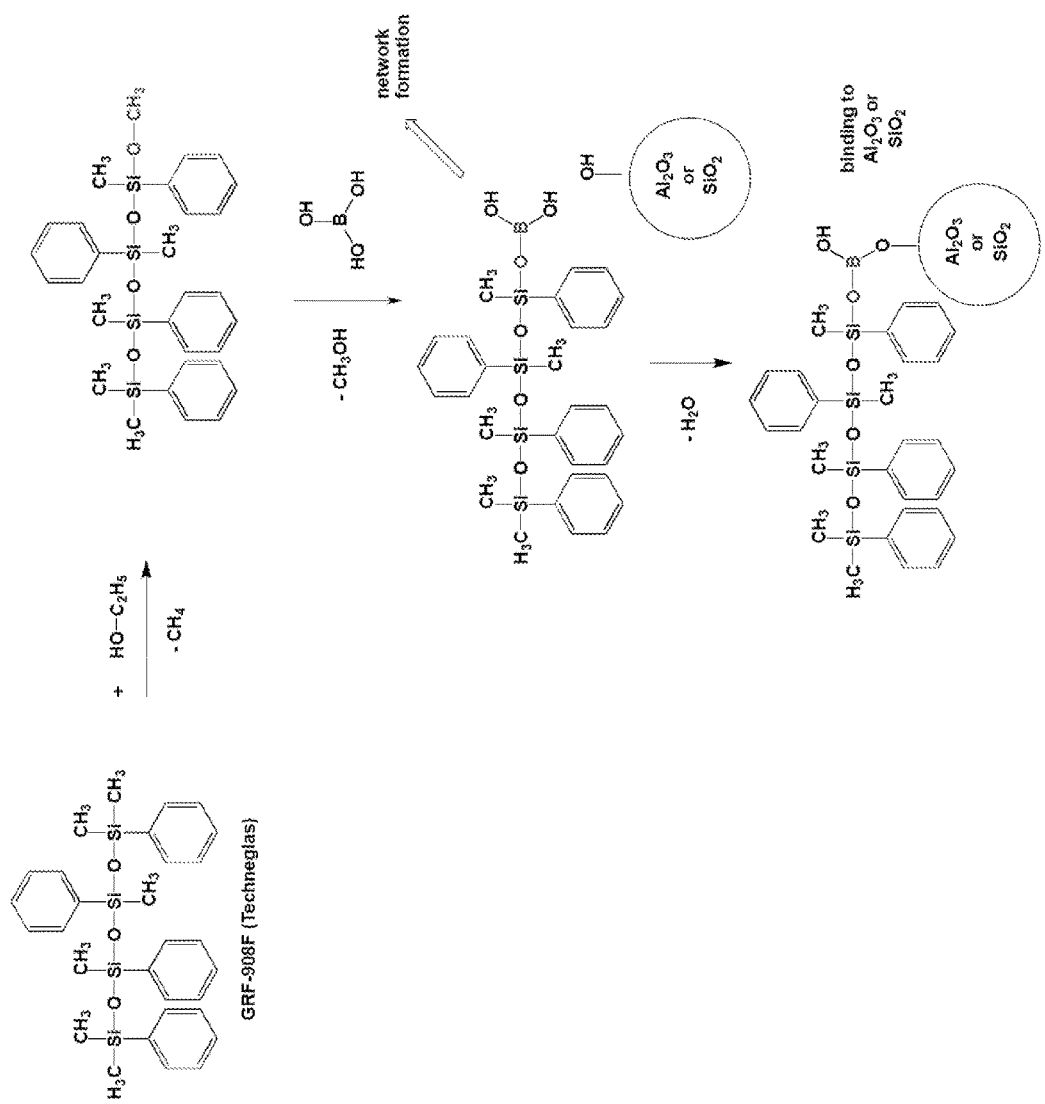
FIG. 9 depicts an exemplary reaction of polysiloxane and boric acid forming polymeric networks that bind to aluminum oxide or silica constituents.

As depicted at FIG. 9, the acidic pH provided by the presence of formic acid facilitates the surface modification of GRF-908F resin by reacting with the ethanolic solvent, promotes the binding of boric acid to the surface of GRF-908F resin, promotes the binding of boric acid to aluminum oxide or Cabot 5760 fumed silica. During the curing process, formic acid (HCOOH) generally decomposes to CO (carbon monoxide) and water, thus permitting its complete removal from the composite Table 1 below lists the components of the compositions of Composites 1, 2, 3, and 4 at weight percentages of the total composition.

TABLE 1

The compositions of Composites 1, 2, 3, and 4

| Component | Composite 1 (%, w/w) | Composite 2 (%, w/w) | Composite 3 (%, w/w) | Composite 4 (%, w/w) |
|---|---|---|---|---|
| GR-908F resin (Techneglas) | 24.4% | 24.2% | 27.7% | 22.6% |
| denatured alcohol | 30.1% | 29.7% | 21.4% | 27.6% |
| boric acid | 6.4% | 6.3% | 7.1% | 5.9% |
| formic acid | 0.8% | 0.7% | 0.8% | 0.7% |
| aluminum oxide C or Cabot 5760 fumed silica | 0.8% | 0.7% | 0.8% | 0.7% |
| MK powdered resin | 24.4% | 24.2% | — | 22.6% |
| Wacker ™ MSE 100 resin | — | — | 27.7% | — |
| Silres ™ SY 409 resin | 5.6% | 5.6% | 6.3% | 5.2% |
| DT-6060 | 4.9% | 4.8% | 5.5% | 4.5% |
| black mica | 2.4% | 2.4% | — | 2.3% |
| carbon nanofibers | 0.2% | 0.2% | — | 0.2% |
| Tyzor ™ TnBP | — | 1.2% | 1.4% | — |
| Dow Corning ™ 3055 resin | — | — | — | 6.8% |
| Dow Corning ™ 3074 intermediate | — | — | 0.8% | 0.7% |
| Byk A-515 surfactant | — | — | 0.8% | — |

Figure 10:
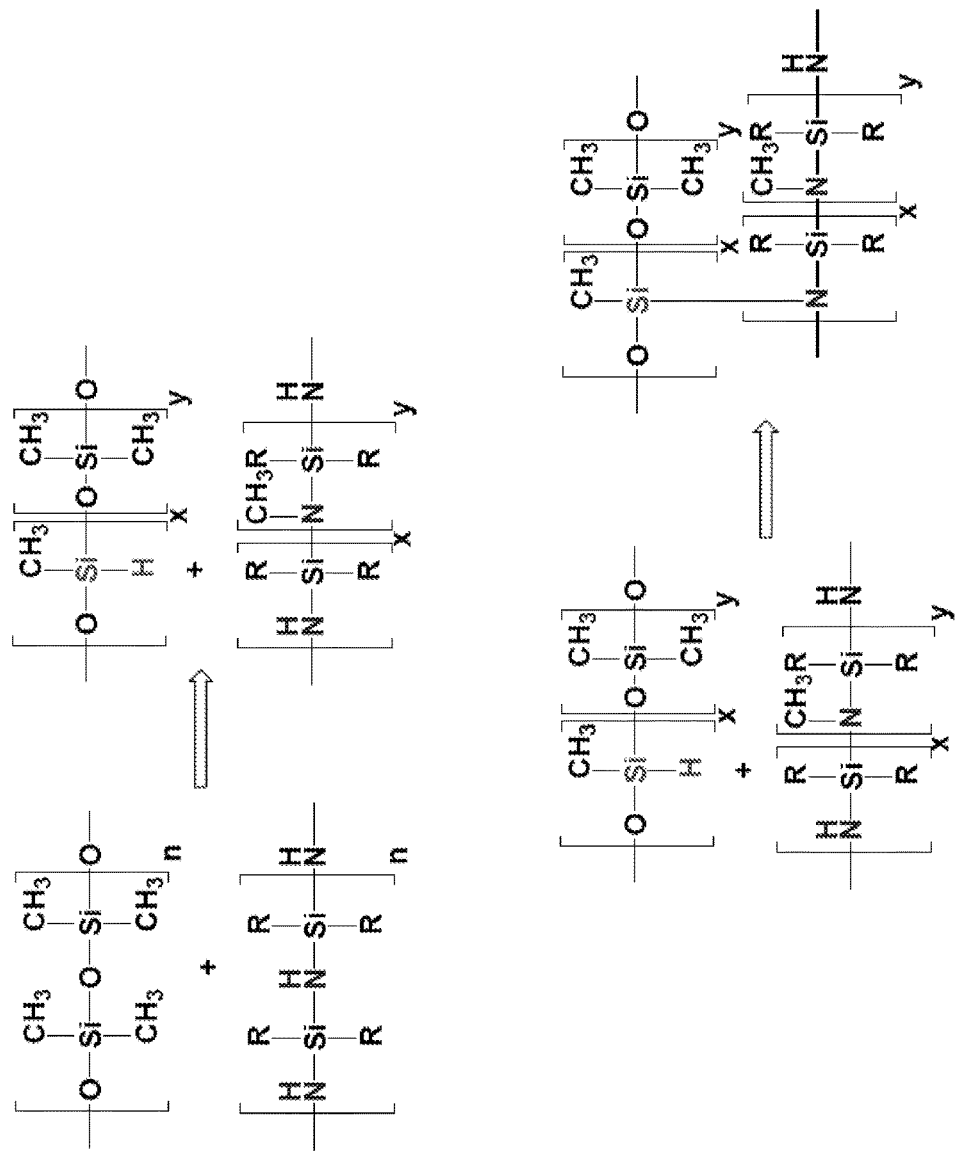
FIG. 10 depicts exemplary reactions between methyl group-containing polysiloxanes and polysilazanes.
Figure 11:
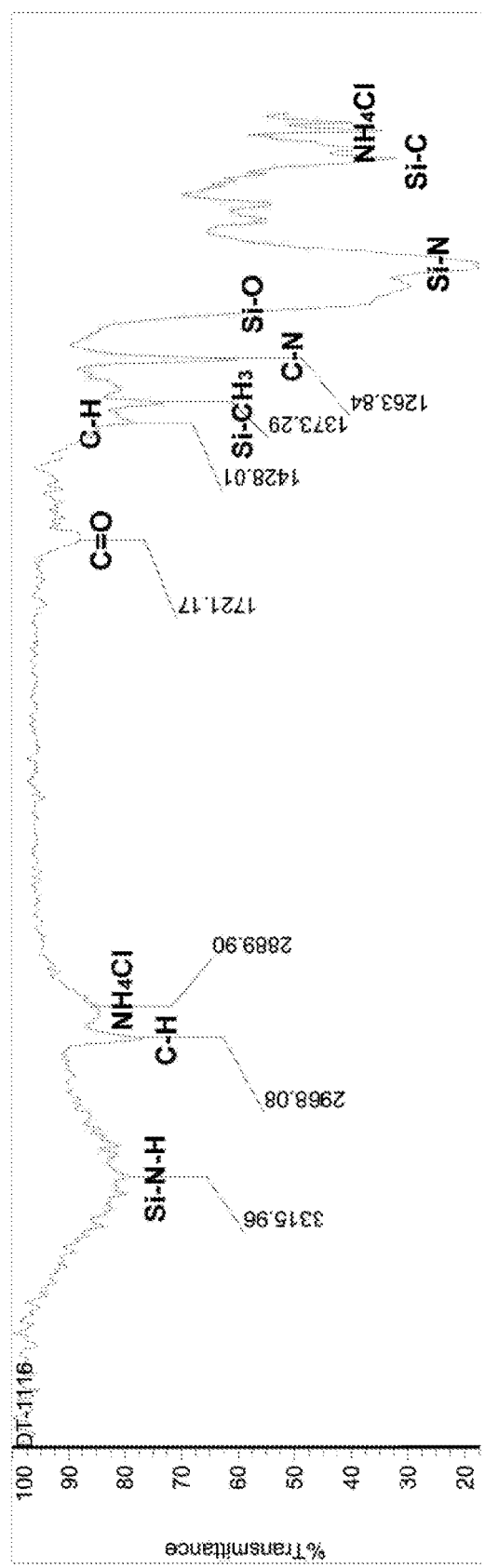
FIG. 11 shows the FTIR spectrum of the composition of Composite 2 after one hour of drying at room temperature.

Referring to FIG. 10, without the presence of Tyzor™ TnBP, the polysilazane from DT-6060 acts as crosslinking agent by reacting with the Si—$CH_3$ groups in Wacker™ MK powdered resin and the Wacker™ SY 409. As shown in the FTIR spectrum for Composite 2 (FIG. 11), in the presence of Tyzor™ TnBP, an additional crosslinking reaction occurs between the Wacker™ MK resin and Tyzor™ TnBP. Since both reactions, polysilazane- and Tyzor-mediated coupling occurred at the surface of Wacker™ MK resin, the final product is one crosslinked layer.

The FTIR spectra of Composite 1 and Composite 2 were compared. Both composites were measured one hour after drying at 350° F. No differences were discernible between the two FTIR spectra. Without wishing to be bound by theory, the polysilazane-mediated crosslinking reaction of Composite 1 and the titanium(IV)-mediated crosslinking reaction of Composite 2 occurred independently of each other, with no noticeable link between the two chemistries.

Example 5—Thermogravimetric Analysis of Composite 1

Samples of Composite 1 were thermogravimetrically analyzed at heating rates of 5, 10, 20, and 40° C./min under a nitrogen atmosphere. The thermal stability of Composite 1 increased as the heating rate increased. Composite 1 was thermally stable to about 650° C. at 5° C./min, then it started losing mass significantly until only 17% of its original mass remained at 1,000° C. In contrast, when Composite 1 was exposed to a higher heating rate of 40° C./min, it was thermally stable until 850° C., and even at 1000° C., about 78% of its original mass still remained.

Composite 1 was compared to a composite formed from Hitco Carbon Composites, Inc.'s MX-4926, a phenolic/carbon fiber-reinforced composite, which is an industry standard carbon composite ablative used extensively by the Department of Defense. The decomposition temperatures ($T_{dec}$) at 10% mass loss for Hitco™ is about 430° C. and Composite 1 was about 680° C.; a significant increase of 250° C. The $T_{dec}$ at 10% mass loss for Hitco™ was about 480° C. and Composite 1 was about 720° C.; a significant increase of 240° C. The $T_{dec}$ at 10% mass loss for Hitco™ was about 500° C. and Composite 1 was about 770° C.; a significant increase of 270° C. The $T_{dec}$ at 10% mass loss for Hitco™ was about 500° C. and Composite 1 was about 830° C.; a significant increase of 330° C. It was observed that Composite 1 behaved even better than in the high heating rate regime. For most high temperature applications, high heating rate data were more realistic simulations than low heating rate data.

The decomposition temperatures ($T_{dec}$) of 10% mass loss and 50% mass loss of Composite 1 and the phenolic/carbon composite are shown in Table 2. The mass remaining values at 1,000° C. of Composite 1 and the phenolic/carbon composite are also shown in Table 3.

TABLE 2

Summary of decomposition temperatures of Composite 1 and the phenolic carbon fiber-reinforced composite at the four heating rates in nitrogen.

| Heating Rate (° C./min) | $T_{dec}$ at 10% Mass Loss (° C.) | | $T_{dec}$ at 50% Mass Loss (° C.) | |
| --- | --- | --- | --- | --- |
| | Composite 1 | Hitco ™ Composite | Composite 1 | Hitco ™ Composite |
| 5 | 671 | 424 | 831 | 608 |
| 10 | 727 | 475 | 920 | 767 |
| 20 | 777 | 513 | N/A* | 891 |
| 40 | 836 | 502 | N/A* | 983 |

*"N/A" indicates that the $T_{dec}$ at 50% was not attained under experimental conditions; that is, >50% of the initial mass of the sample remained at the end of the experiment.

At low heating rate (5° C./min), the $T_{dec}$ at 10% mass loss of Composite 1 was 671° C. vs. 424° C. for the phenolic composite, a ΔT of 247° C. $T_{dec}$ at 50% mass loss of Composite 1 was 831° C. vs. 608° C. of the phenolic composite, a ΔT of 223° C. At high heating rate (40° C./min), the $T_{dec}$ at 10% mass loss of Composite 1 was 836° C. vs. 502° C. of the phenolic composite, a ΔT of 334° C.

TABLE 3

Summary of mass remaining of Composite 1 and the phenolic carbon fiber-reinforced composite at the four heating rates in nitrogen.

| | Mass Remaining (%) at 1,000° C. | |
| --- | --- | --- |
| Heating Rate (° C./min) | Composite 1 | Hitco ™ Phenolic/Carbon Composite |
| 5 | 17.21% | 0.48% |
| 10 | 31.71% | 5.80% |
| 20 | 63.58% | 35.26% |
| 40 | 77.73% | 48.49% |

The mass remaining at 1,000° C. of Composite 1 was 17.21% vs. 0.48% for the phenolic/carbon composite at a low heating rate of 5° C./min. At a high heating rate of 40° C./min, the mass loss remaining at 1,000° C. of Composite 1 was 77.73% vs. 48.49% for the phenolic/carbon composite. High mass remaining means the composite experienced less thermal degradation up to 1,000° C. Microstructural analysis of the post-test specimens using scanning electron microscopy (SEM) helps one to understand the thermal protective mechanism.

The derivative mass loss percentage plot of Composite 1 shows three main mass loss peaks. The lower temperature peak at 98.3° C. could be due to the moisture evaporation. A small peak appeared at 653.3° C. after onset of degradation and the main mass loss peak temperature was at 823.4° C. In comparison, the Hitco™ composite also had several mass loss peaks at 519.1° C., 644.7° C., and 727.5° C., but the overall peak temperatures were lower than Composite 1. The Hitco™ composite main mass loss peak temperature was about 100° C. lower than Composite 1, which made Composite 1 significantly more thermally stable than the Hitco™ composite.

In summary, the TGA and derivative TGA data analyses showed that Composite 1 disclosure herein was significantly more thermally stable than the commercial Hitco™ phenolic/carbon composite, making it a better candidate for high-temperature applications, such as thermal protection systems for re-entry vehicles.

While specific embodiments have been described above with reference to the disclosed embodiments and examples, such embodiments are only illustrative and do not limit the scope of the disclosure. Changes and modifications can be made in accordance with ordinary skill in the art without departing from the disclosure in its broader aspects as defined in the following claims.

What is claimed is:

1. A composition comprising:
   from 50% (w/w of the total composition) to 60% (w/w of the total composition) polysiloxane consisting essentially of polyphenylmethylsiloxane and α,ω-methoxy-terminated polydimethylsiloxane;
   from 40% (w/w of the total composition) to 50% (w/w of the total composition) organic solvent;
   from 2% (w/w of the total composition) to 4% (w/w of the total composition) polysilazane; and
   polysilane of a formula $(R_1R_2Si)_n$, wherein n is greater than 1, and wherein $R_1$ and $R_2$ are the same or different and are alkyl, alkenyl, cycloalkyl, alkylamino, aryl, aralkyl, or alkylsilyl;
   which composition before curing is suitable for forming the matrix in a composite; and
   which composition, after curing, is a binder for forming a composition-fiber composite.

2. The composition of claim 1, further comprising from 0.1% (w/w of the total composition) to 2% (w/w of the total composition) of an enhancer selected from butyltitanate and aminoethylaminopropyltrimethoxysilane $(H_2NC_2H_4NHC_3H_6—Si(OCH_3)_3)$.

3. The composition of claim 1, wherein the polyphenylmethylsiloxane comprises a mixture compound having formula $(CH_3SiO_{1.5})_x(C_6H_5SiO_{1.5})_y$, wherein each x and y are greater than 1, and

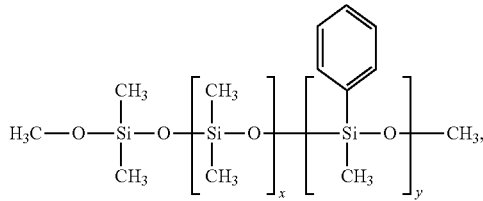

wherein x and y are each between 5 and 25.

4. The composition of claim 1, wherein the α,ω-methoxy-terminated polydimethylsiloxane has the formula

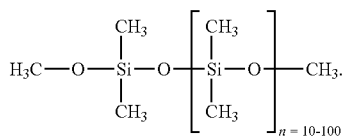

5. The composition of claim 1, wherein the solvent is isopropyl alcohol.

6. The composition of claim 1, wherein the polysilazane is a polydimethylsilazane comprising the formula $(CH_3)_3Si-NH-[(CH_3)_2Si-NH]_n-Si(CH_3)_3$, wherein n greater than 1.

7. The composition of claim 1, wherein the polysilane is polydimethylsilane.

8. A composition comprising:
from 50% (w/w of the total composition) to 60% (w/w of the total composition) polysiloxane consisting essentially of polyphenylmethylsiloxane and α,ω-methoxy-terminated polydimethylsiloxane; wherein the polyphenylmethylsiloxane comprises a mixture compound having formula $(CH_3SiO_{1.5})_x(C_6H_5SiO_{1.5})_y$, wherein each x and y are greater than 1, and

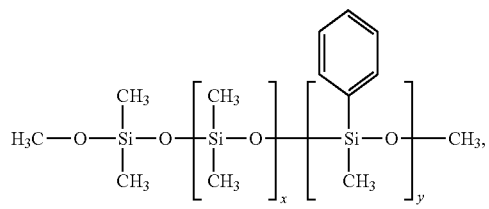

wherein x and y are each between 5 and 25; and wherein the α,ω-methoxy-terminated polydimethylsiloxane has the formula

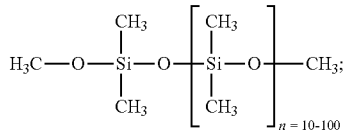

from 40% (w/w of the total composition) to 50% (w/w of the total composition) isopropyl alcohol;
from 2% (w/w of the total composition) to 4% (w/w of the total composition) polydimethylsilazane comprising the formula $(CH_3)_3Si-NH-[(CH_3)_2Si-NH]_n-Si(CH_3)_3$, wherein n greater than 1;
from 0.1% (w/w of the total composition) to 2% (w/w of the total composition) of an enhancer selected from butyltitanate and aminoethylaminopropyltrimethoxysilane $(H_2NC_2H_4NHC_3H_6-Si(OCH_3)_3)$; and
polydimethylsilane having the formula

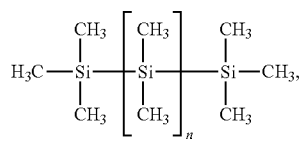

wherein n is greater than 1;
which composition before curing is suitable for forming the matrix in a composite which composition, after curing, is a binder for forming a composition-fiber composite.

9. A composite, comprising:
a composition-fiber mixture comprising fibers and a composition, the composition comprising from 50% (w/w of the total composition) to 60% (w/w of the total composition) polysiloxane consisting essentially of polyphenylmethylsiloxane and α,ω-methoxy-terminated polydimethylsiloxane;
from 40% (w/w of the total composition) to 50% (w/w of the total composition) organic solvent;
from 2% (w/w of the total composition) to 4% (w/w of the total composition) polysilazane; and
polysilane of a formula $(R_1R_2Si)_n$, wherein n is greater than 1, and wherein $R_1$ and $R_2$ are the same or different and are alkyl, alkenyl, cycloalkyl, alkylamino, aryl, aralkyl, or alkylsilyl;
which composition before curing is suitable for forming the matrix in a composite; and
wherein the composition-fiber mixture is cured under vacuum at a temperature of 200° F. to 450° F. for 30 minutes to 180 minutes to form the composite.

10. The composite of claim 9, wherein the composition further comprises from 0.1% (w/w of the total composition) to 2% (w/w of the total composition) of an enhancer selected from butyltitanate and aminoethylaminopropyltrimethoxysilane $(H_2NC_2H_4NHC_3H_6-Si(OCH_3)_3)$.

11. The composite of claim 9, wherein the fibers are chosen from carbon fibers, basalt, e-glass, glass ribbon, fiberglass, quartz, and ceramic.

12. The composite of claim 9, wherein the fibers are in the form of one chosen from woven strands, mesh, felt, needle-punched felt, and cloth tape.

13. The composite of claim 9, wherein the fibers are a carbon fiber cloth.

14. The composite of claim 9, wherein the ratio of composition to fibers is 35:65 to 45:55 (w/w).

15. The composite of claim 9, further comprising one or more chosen from vermiculite, hollow glass, and ceramic spheres.

16. The composite of claim 9, wherein the curing occurs at a temperature of 200° F. to 350° F. for 60 minutes to 120 minutes.

17. The composite of claim 9, wherein the composite has a $T_{dec}$ at 10% mass loss of at least 600° C.

18. The composite of claim 17, wherein the composite has a $T_{dec}$ at 10% mass loss of at least 700° C.

19. The composite of claim 18, wherein the composite has a $T_{dec}$ at 10% mass loss of at least 800° C.

20. The composite of claim 19, wherein the composite has a $T_{dec}$ at 50% mass loss of at least 1,000° C.

21. A method for forming a composite, comprising:
providing a composition comprising from 50% (w/w of the total composition) to 60% (w/w of the total composition) polysiloxane consisting essentially of polyphenylmethylsiloxane and α,ω-methoxy-terminated polydimethylsiloxane;
from 40% (w/w of the total composition) to 50% (w/w of the total composition) organic solvent;
from 2% (w/w of the total composition) to 4% (w/w of the total composition) polysilazane; and
polysilane of a formula $(R_1R_2Si)_n$, wherein n is greater than 1, and wherein $R_1$ and $R_2$ are the same or different and are alkyl, alkenyl, cycloalkyl, alkylamino, aryl, aralkyl, or alkylsilyl;

which composition before curing is suitable for forming the matrix in a composite;

mixing the composition with fibers in a ratio of 35:65 to 45:55 (w/w); and curing the composition-fiber mixture under vacuum at a temperature of 200° F. to 450° F. for 30 minutes to 180 minutes to form a composite.

22. The method of claim 21, wherein the composition further comprises from 0.1% (w/w of the total composition) to 2% (w/w of the total composition) of an enhancer selected from butyltitanate and aminoethylaminopropyltrimethoxysilane ($H_2NC_2H_4NHC_3H_6$—$Si(OCH_3)_3$).

23. The method of claim 21, wherein the fibers are from carbon fibers, basalt, e-glass, glass ribbon, fiberglass, quartz, and ceramic.

24. The method of claim 21, wherein the fibers are in the form of one chosen from woven strands, mesh, felt, needle-punched felt, felt, and cloth tape.

25. The method of claim 21, wherein the fibers are a carbon fiber cloth.

26. The method of claim 21, further comprising shaping the composition-fiber mixture before curing.

27. The method of claim 21, further comprising partially curing the composition-fiber mixture before shaping the composition-fiber mixture.

28. The method of claim 21, wherein the composition-fiber mixture further comprises one or more chosen from vermiculite, hollow glass, and ceramic spheres.

29. The method of claim 21, wherein curing occurs in at least one chosen from vacuum bags, shrink tape wraps, pre-designed male-to-female mold sets, squeeze plates, and hot press plates.

30. The method of claim 21, wherein curing occurs at a temperature of 200° F. to 350° F. for 60 minutes to 120 minutes.

* * * * *